US012800973B2

(12) United States Patent
Cai

(10) Patent No.: US 12,800,973 B2
(45) Date of Patent: Nov. 17, 2026

(54) ARRAY SUBSTRATE, DISPLAY APPARATUS, AND ELECTRONIC DEVICE

(71) Applicant: HONOR DEVICE CO., LTD., Shenzhen (CN)

(72) Inventor: Peizhi Cai, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 406 days.

(21) Appl. No.: 18/269,103

(22) PCT Filed: Dec. 30, 2022

(86) PCT No.: PCT/CN2022/143984
§ 371 (c)(1),
(2) Date: Jun. 22, 2023

(87) PCT Pub. No.: WO2023/160243
PCT Pub. Date: Aug. 31, 2023

(65) Prior Publication Data

US 2024/0192566 A1 Jun. 13, 2024

(30) Foreign Application Priority Data

Feb. 25, 2022 (CN) ........................ 202210180433.4

(51) Int. Cl.
*G02F 1/16756* (2019.01)
*G02F 1/167* (2019.01)
*G02F 1/1681* (2019.01)

(52) U.S. Cl.
CPC .......... *G02F 1/16756* (2019.01); *G02F 1/167* (2013.01); *G02F 1/1681* (2019.01)

(58) Field of Classification Search
CPC .... G02F 1/167; G02F 1/1676; G02F 1/16766; G02F 1/1681; G02F 1/16756;
(Continued)

(56) References Cited

U.S. PATENT DOCUMENTS 6,914,713 B2 7/2005 Chung et al.
7,414,776 B2 8/2008 Liu et al.
(Continued)

FOREIGN PATENT DOCUMENTS

CN 1453621 A 11/2003
CN 1892396 A 1/2007
(Continued)

*Primary Examiner* — Brandi N Thomas
(74) *Attorney, Agent, or Firm* — WOMBLE BOND DICKINSON (US) LLP

(57) ABSTRACT

This application provides an array substrate, a display apparatus, and an electronic device. The display apparatus includes a plurality of microcup units. Each of the microcup units includes at least one microcup. Electrophoretic particles are encapsulated in each of the at least one microcup. The array substrate includes a first base, a plurality of pixel units arranged in an array on the first base, and an insulating layer. The plurality of pixel units are in one-to-one correspondence to the plurality of microcup units. Each of the pixel units includes a first pixel electrode and a first common electrode. The insulating layer covers the first pixel electrode and the first common electrode of each of the pixel units.

16 Claims, 20 Drawing Sheets

(58) Field of Classification Search

CPC ............... G02F 1/16757; G02F 1/1685; G02F 1/16761; G02F 1/16762; G02F 1/16755; G02F 2001/1678; G02F 1/133354; G02F 1/1343; G02F 2201/123; G09G 3/344; G09F 9/37

See application file for complete search history.

(56) References Cited

U.S. PATENT DOCUMENTS

| | | | | |
|---|---|---|---|---|
| 8,349,194 | B2 | 1/2013 | Paek et al. | |
| 8,570,640 | B2 | 10/2013 | Lim et al. | |
| 11,237,381 | B2 | 2/2022 | Lv et al. | |
| 11,657,771 | B2 | 5/2023 | Miyata et al. | |
| 2003/0016429 | A1 | 1/2003 | Ikeda et al. | |
| 2004/0239613 | A1 | 12/2004 | Kishi et al. | |
| 2007/0268245 | A1* | 11/2007 | Sugita | G02F 1/167 345/107 |
| 2009/0015545 | A1 | 1/2009 | Kato et al. | |
| 2012/0154898 | A1 | 6/2012 | Kwon et al. | |
| 2018/0129080 | A1 | 5/2018 | O'Keeffe et al. | |

FOREIGN PATENT DOCUMENTS

| | | | | |
|---|---|---|---|---|
| CN | 101303504 | A | 11/2008 | |
| CN | 101710220 | A | 5/2010 | |
| CN | 101710221 | A | 5/2010 | |
| CN | 102385214 | A | 3/2012 | |
| CN | 102707534 | A | 10/2012 | |
| CN | 105182653 | A | 12/2015 | |
| CN | 106814515 | A | 6/2017 | |
| CN | 108897180 | A | 11/2018 | |
| CN | 110596985 | A | 12/2019 | |
| CN | 110824806 | A | 2/2020 | |
| CN | 113791512 | A | 12/2021 | |
| JP | 2004294955 | A * | 10/2004 | G02F 1/167 |

* cited by examiner

ARRAY SUBSTRATE, DISPLAY APPARATUS, AND ELECTRONIC DEVICE

CROSS-REFERENCE TO RELATED APPLICATIONS

This application is a national stage of International Application No. PCT/CN2022/143984, filed on Dec. 30, 2022, which claims priority to Chinese Patent Application No. 202210180433.4, filed on Feb. 25, 2022. The disclosures of both of the aforementioned applications are hereby incorporated by reference in their entireties.

TECHNICAL FIELD

This application relates to the field of display technologies, and in particular, to an array substrate, a display apparatus, and an electronic device.

BACKGROUND

An electronic ink screen, also known as an electronic paper display screen, is a core technology and product of reflective display, with core competitiveness of eye protection and low power consumption, which has achieved rapid development. An operating principle of the electronic ink screen is to use an electric field to control electrophoretic particles, such as positively charged black particles and negatively charged white particles, in an electrophoretic fluid in each pixel to move, and to reflect external ambient light through the electrophoretic particles to achieve a visual effect, thereby realizing display of a picture.

The electronic ink screen also has a display mode which is a transmissive display mode. That is, when ink particles are dispersed in ink, the display screen in this case is in a non-transmissive state and displays colors of the ink particles, such as black, white, or other colors. When a parallel electric field is applied, the ink particles are gathered around an electrode, the display screen in this case is in a transmissive state, and transparent display is realized. The electrode is generally wider. As a result, the ink particles block more light when gathered around the electrode, leading to a significant reduction in transmittance of the display screen.

SUMMARY

This application provides an array substrate, a display apparatus, and an electronic device. The display apparatus has higher transmittance and can realize a good transparent display effect.

According to a first aspect, this application provides an array substrate, applied to a display apparatus, the display apparatus further including a plurality of microcup units, each of the microcup units including at least one microcup, and electrophoretic particles being encapsulated in each of the at least one microcup. The array substrate includes a first base and a plurality of pixel units arranged in an array on the first base, the plurality of pixel units being in one-to-one correspondence to the plurality of microcup units. Each of the pixel units includes a first pixel electrode and a first common electrode that are disposed on the first base. The array substrate further includes an insulating layer covering the first pixel electrode and the first common electrode of each of the pixel units, a surface of the insulating layer facing away from the first base being provided with grooves/a groove corresponding to the first pixel electrode and/or the first common electrode of each of the pixel units, a width of the groove being less than that of the corresponding electrode, the groove being configured to gather the electrophoretic particles in the corresponding microcup.

It may be understood that, due to the existence of the groove, the bottom of the microcup is a three-dimensional design, and the electrophoretic particles are gathered into the groove above the electrode and are longitudinally arranged when the pixel unit is in a transmissive display mode. Since the width of the groove is less than that of the corresponding electrode and the electrophoretic particles are longitudinally arranged in the groove, shielding of light by the gathered electrophoretic particles can be effectively reduced, and transmittance of the pixel unit can be significantly improved, thereby enabling the display apparatus to achieve a good transparent display effect.

In an implementation, the surface of the insulating layer facing away from the first base is provided with the groove corresponding to the first pixel electrode, and the first pixel electrode is configured to attract the electrophoretic particles in the corresponding microcup when the corresponding pixel unit is in the transmissive display mode, so that the electrophoretic particles are gathered into the groove corresponding to the first pixel electrode.

Additionally/alternatively, the surface of the insulating layer facing away from the first base is provided with the groove corresponding to the first common electrode, and the first common electrode is configured to attract the electrophoretic particles in the corresponding microcup when the corresponding pixel unit is in the transmissive display mode, so that the electrophoretic particles are gathered into the groove corresponding to the first common electrode.

In an implementation, the groove includes a bottom and a side wall connected to the bottom. The side wall is perpendicular to the bottom. That is, an angle between the side wall and the bottom is a right angle. In this way, a width of an open end of the groove is equal to that of the bottom of the groove.

Optionally, the angle between the side wall and the bottom is an acute angle. That is, the side wall is an inclined surface. In this way, the width of the open end of the groove is less than that of the bottom of the groove, so that the electrophoretic particles can be gathered into the groove in the transmissive display mode.

Optionally, the angle between the side wall and the bottom is an obtuse angle. That is, the side wall is an inclined surface. In this way, the width of the open end of the groove is greater than that of the bottom of the groove, which can facilitate entry and exit of the electrophoretic particles from the groove.

In an implementation, the groove includes a bottom, a side wall, and a first connecting portion, the first connecting portion being connected between the bottom and the side wall, and the first connecting portion being arc-shaped, so that the side wall smoothly transitions to the bottom.

In an implementation, the groove includes a bottom and a side wall connected to the bottom. The groove further includes a second connecting portion, the second connecting portion being connected between the surface of the insulating layer and the side wall, and the second connecting portion being arc-shaped, so that the side wall smoothly transitions to the surface of the insulating layer.

In an implementation, the microcup includes two types of electrophoretic particles with different colors and different electrical properties; and the surface of the insulating layer facing away from the first base is provided with the grooves respectively corresponding to the first pixel electrode and the first common electrode, and when the pixel unit is in the transmissive display mode, the first pixel electrode is configured to attract one type of the electrophoretic particles in the microcup into the groove corresponding to the first pixel electrode, and the first common electrode is configured to attract the other type of the electrophoretic particles in the microcup into the groove corresponding to the first common electrode. In this way, the pixel unit can be rendered transparent.

Optionally, the microcup includes electrophoretic particles in one color; and the surface of the insulating layer facing away from the first base is provided with the groove corresponding to the first pixel electrode or the first common electrode, and when the pixel unit is in the transmissive display mode, the first pixel electrode or the first common electrode corresponding to the groove is configured to attract the electrophoretic particles in the microcup into the groove. In this way, the pixel unit can be rendered transparent.

Optionally, the microcup includes electrophoretic particles in one color; and the surface of the insulating layer facing away from the first base is provided with the grooves respectively corresponding to the first pixel electrode and the first common electrode, and when the pixel unit is in the transmissive display mode, the first pixel electrode is configured to attract the electrophoretic particles in the microcup into the groove corresponding to the first pixel electrode, or the first common electrode is configured to attract the electrophoretic particles in the microcup into the groove corresponding to the first common electrode. In other words, the groove corresponding to one electrode is in a vacant state when the pixel unit is in the transmissive display mode. In this way, the pixel unit can also be rendered transparent.

In an implementation, each of the pixel units includes a plurality of first pixel electrodes and a plurality of first common electrodes, the plurality of first pixel electrodes extending along a first direction and being arranged apart along a second direction, and the plurality of first common electrodes extending along the first direction and being arranged apart along the second direction. Each of the first pixel electrodes is disposed between two adjacent first common electrodes, or each of the first common electrodes is disposed between two adjacent first pixel electrodes, where the first direction is perpendicular to the second direction.

In an implementation, each of the microcup units includes electrophoretic particles in one color, and each of the at least one microcup corresponds to at least one first pixel electrode and at least one first common electrode included in the corresponding pixel unit. When the pixel unit is in a non-transmissive display mode, the first pixel electrode and the first common electrode are configured to generate a first driving electric field in the corresponding microcup to control the electrophoretic particles in the corresponding microcup to move along a direction parallel to the first base, so that the electrophoretic particles are evenly dispersed in an electrophoretic fluid. An electric field direction of the first driving electric field is a direction parallel to the first base.

In an implementation, the display apparatus further includes a second base disposed opposite the array substrate and a second common electrode disposed on the second base, and the plurality of microcup units are disposed between the array substrate and the second common electrode. Each of the at least one microcup corresponds to the second common electrode and at least one first pixel electrode and at least one first common electrode included in the corresponding pixel unit. When the pixel unit is in a non-transmissive display mode, the first pixel electrode and the first common electrode are configured to generate a first driving electric field in the corresponding microcup to control the electrophoretic particles in the corresponding microcup to move along a direction parallel to the first base, so that the electrophoretic particles are evenly dispersed in an electrophoretic fluid. The first pixel electrode and the second common electrode are configured to generate a second driving electric field in the corresponding microcup to cause the electrophoretic particles in the corresponding microcup to move towards the first pixel electrode or the second common electrode according to electrical properties of the electrophoretic particles and an electric field direction of the second driving electric field. The electrophoretic particles that need to participate in color rendering move to the top of the corresponding microcup, that is, near the second common electrode, and the electrophoretic particles that do not participate in the color rendering move to the bottom of the corresponding microcup, that is, near the first pixel electrode, so that the corresponding microcup renders black, white, or other colors. An electric field direction of the first driving electric field is a direction parallel to the first base, and the electric field direction of the second driving electric field is a direction perpendicular to the first base.

In an implementation, each of the pixel units further includes a thin film transistor and at least one second pixel electrode, the second pixel electrode being electrically connected to the plurality of first pixel electrodes included in the corresponding pixel unit and a drain of the thin film transistor respectively, the second pixel electrode being configured to electrically connect the plurality of first pixel electrodes included in the corresponding pixel unit to the drain of the corresponding thin film transistor respectively, thereby realizing driving of the corresponding first pixel electrodes and the second pixel electrode by the thin film transistor.

In an implementation, the insulating layer further covers the second pixel electrode, the surface of the insulating layer facing away from the first base is provided with the groove corresponding to the second pixel electrode, and the second pixel electrode is configured to attract the electrophoretic particles in the corresponding microcup when the corresponding pixel unit is in a transmissive display mode, so that the electrophoretic particles are gathered into the groove corresponding to the second pixel electrode, thereby further improving the transmittance of the corresponding pixel unit and the transparent display effect of the display apparatus.

According to a second aspect, this application provides a display apparatus, including the above array substrate, a second base disposed opposite the array substrate, and a plurality of microcup units disposed between the array substrate and the second base, the plurality of microcup units being in one-to-one correspondence to the plurality of pixel units included in the array substrate.

According to a third aspect, this application provides an electronic device, including a host and the above display apparatus. Due to the use of the above array substrate, the display apparatus can have higher transmittance when the pixel unit is in the transmissive display mode, and can achieve a good transparent display effect. Therefore, the electronic device also has a good transparent display effect.

BRIEF DESCRIPTION OF DRAWINGS

To describe the technical solutions in implementations of this application more clearly, the accompanying drawings that need to be used in the implementations of this application will be briefly introduced below. Apparently, the accompanying drawings described below are merely some implementations of this application, and a person of ordinary skill in the art may further obtain other accompanying drawings according to the accompanying drawings without creative efforts.

LIST OF REFERENCE NUMERALS

Figure 1:
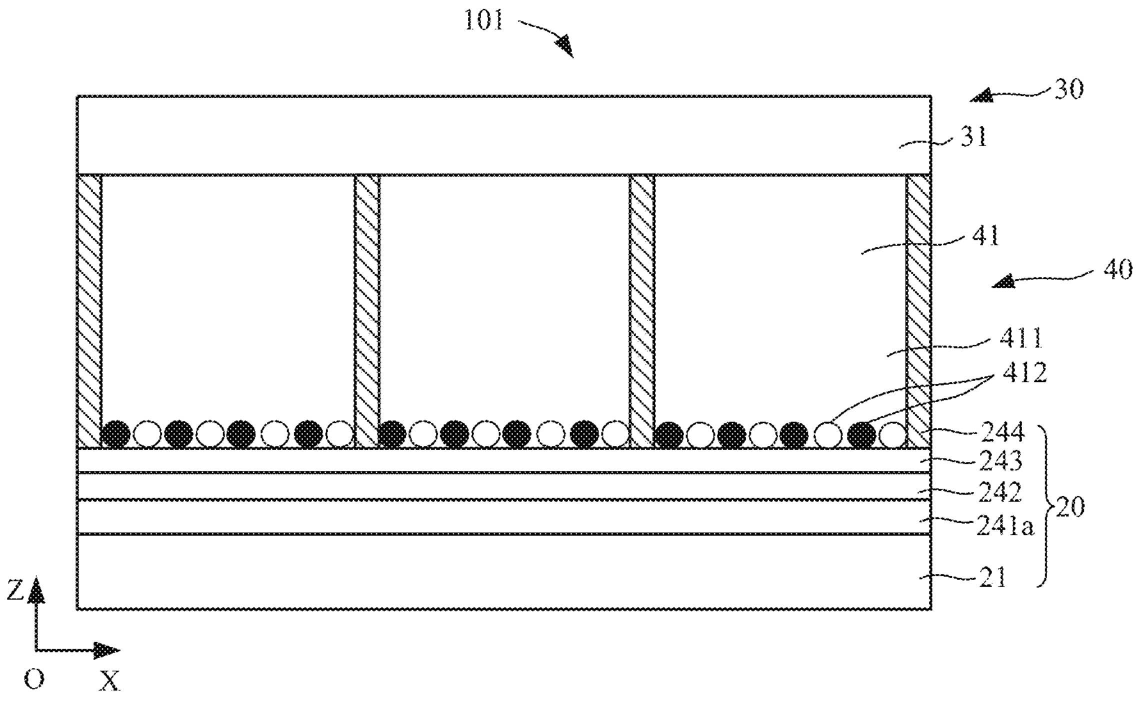
FIG. 1 is a schematic side view of a structure of a display apparatus according to a first implementation of this application.

| | |
|---|---|
| Display apparatus | 100, 101, 101a to 101b, 102a to 102d, 103a to 103c |
| First substrate | 20, 20' |
| First base | 21 |
| Scanning line | 22 |
| Data line | 23 |
| Pixel region | A |
| Pixel unit | 24 |
| Thin film transistor | 241 |
| Stacked structure | 241a |
| Pixel electrode layer | 242 |
| First pixel electrode | 2421 |
| Second pixel electrode | 2422 |
| Insulating layer | 2423 |
| First common electrode layer | 243 |
| First common electrode | 2431 |
| Insulating layer | 2432 |
| Barrier wall | 244 |
| Insulating layer | 245 |
| Surface | 2451 |
| Groove | 2452, 50 |
| Second substrate | 30 |
| Second base | 31 |
| Second common electrode | 32 |
| Electronic ink layer | 40 |
| Microcup unit | 41 |
| Microcup | 411, 411a, 411b, 411c, 411d |
| Electrophoretic particle | 412 |
| Host | 200 |
| Electronic device | 1000 |

This application will be further described with reference to the following specific implementations and the above accompanying drawings.

DESCRIPTION OF EMBODIMENTS

The following clearly and completely describes the technical solutions in the implementations of this application with reference to the accompanying drawings in the implementations of this application. The accompanying drawings are for illustrative purposes only, and represent only schematic diagrams, which should not be construed as limiting this application. Apparently, the described implementations are only a part of rather than all of the implementations of this application. All other implementations obtained by a person of ordinary skill in the art based on the implementations of this application without creative efforts shall fall within the protection scope of this application.

Unless otherwise defined, meanings of all technical and scientific terms used in this application are the same as those generally understood by a person skilled in the art to which this application belongs. In this application, terms used in the specification are merely intended to describe objectives of the specific implementations, but are not intended to limit this application.

This application provides an array substrate applied to a display apparatus. The array substrate includes a first base and a plurality of pixel units arranged in an array on the first base, and the plurality of pixel units are in one-to-one correspondence to a plurality of microcup units included in the display apparatus. Each of the pixel units include a first pixel electrode and a first common electrode that are disposed on the first base. The array substrate further includes an insulating layer covering the first pixel electrode and the first common electrode of each of the pixel units. A surface of the insulating layer facing away from the first base is provided with grooves/a groove corresponding to the first pixel electrode and/or the first common electrode of each of the pixel units. A width of the groove is less than that of the corresponding electrode, and the groove is configured to gather the electrophoretic particles in the corresponding microcup. Due to the existence of the groove, the bottom of the microcup is a three-dimensional design, and the electrophoretic particles are gathered into the groove above the electrode and are longitudinally arranged when the pixel unit is in a transmissive display mode. Since the width of the groove is less than that of the corresponding electrode and the electrophoretic particles are longitudinally arranged in the groove, shielding of light by the gathered electrophoretic particles can be effectively reduced, and transmittance of the pixel unit can be significantly improved, thereby enabling the display apparatus to achieve a good transparent display effect.

This application further provides a display apparatus, including the above array substrate, a second base disposed opposite the array substrate, and a plurality of microcup units disposed between the array substrate and the second base. The plurality of microcup units are in one-to-one correspondence to the plurality of pixel units included in the array substrate. Due to the use of the above array substrate, the display apparatus can have higher transmittance when the pixel unit is in the transmissive display mode, so as to achieve a good transparent display effect. The display apparatus is widely applicable to various fields, such as an e-book reader, a medical application (such as a glucometer or a sphygmomanometer), a wearable device (such as a watch or a bracelet), an indoor electronic display board, an electronic shelf label, a logistics label, a highway sign, or other Internet applications.

This application further provides an electronic device, including the above display apparatus. Therefore, the electronic device also has a good transparent display effect. The electronic device includes, but is not limited to, an e-book reader, a medical application (such as a glucometer or a sphygmomanometer), a wearable device (such as a watch or a bracelet), an indoor electronic display board, an electronic curtain, and the like.

FIG. 1 is a schematic side view of a structure of a display apparatus 101 according to a first implementation of this application. As shown in FIG. 1, in the first implementation, the display apparatus 101 includes a first substrate 20, a second substrate 30, and an electronic ink layer 40. The first substrate 20 is disposed opposite the second substrate 30, and the electronic ink layer 40 is disposed between the first substrate 20 and the second substrate 30. In this application, the display apparatus 101 is an electronic ink screen, and the first substrate 20 is an array substrate or a thin film transistor substrate.

Figure 2:
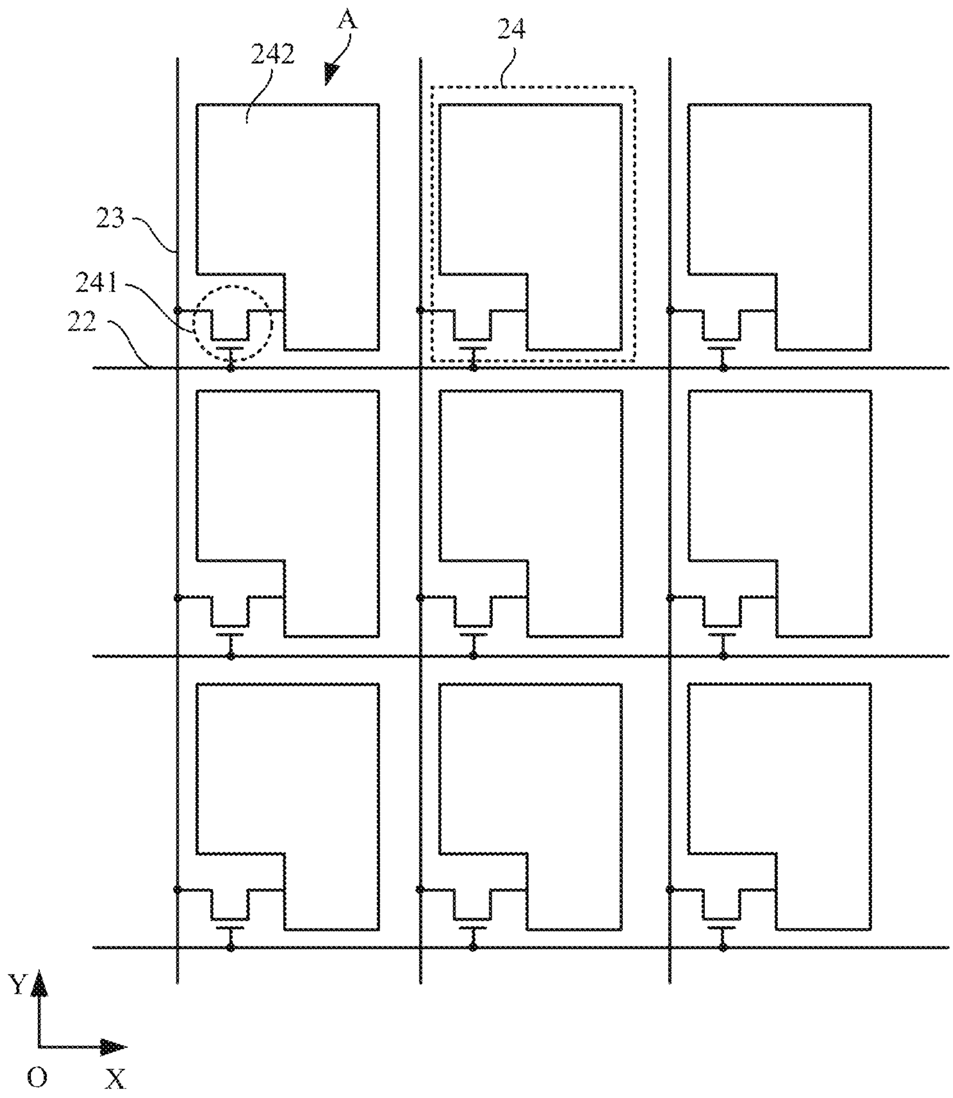
FIG. 2 is a schematic plan view of a partial circuit structure of a first substrate included in the display apparatus shown in FIG. 1.

FIG. 2 is a schematic plan view of a partial circuit structure of the first substrate 20. Referring to FIG. 1 and FIG. 2 together, the first substrate 20 includes a first base 21 and a plurality of scanning lines 22, a plurality of data lines 23, and a plurality of pixel units 24 that are disposed on the first base 21. The first base 21 is made of a transparent material such as glass.

The plurality of pixel units 24 are arranged in an array on the first base 21. Specifically, the scanning lines 22 are arranged apart from each other, the data lines 23 are arranged apart from each other, and the scanning lines 22 and the data lines 23 intersect to define a plurality of pixel regions A arranged in a matrix. The plurality of pixel regions A are in one-to-one correspondence to the plurality of pixel units 24. The pixel units 24 are located in the corresponding pixel regions A.

Each pixel unit 24 includes a thin film transistor (Thin Film Transistor, TFT) 241 and a pixel electrode layer 242 that are located on the first base 21. The thin film transistor 241 is formed at an intersection between the corresponding scanning line 22 and the corresponding data line 23. In the first implementation, as shown in FIG. 1, a stacked structure 241*a* of the thin film transistor 241 is formed on the first base 21, and the pixel electrode layer 242 is formed on the stacked structure 241*a* of the thin film transistor 241.

The stacked structure 241*a* of the thin film transistor 241 may include a buffer layer (not shown) formed on the first base 21, a gate (not shown) formed on the buffer layer, a gate insulating layer (not shown) covering the gate, an active region (not shown) formed on the gate insulating layer, a source (not shown) and a drain (not shown) electrically connected to the active region respectively, a passivation layer (not shown) covering the source and the drain, and the like. As shown in FIG. 2, the gate of the thin film transistor 241 is electrically connected to the corresponding scanning line 22, the source of the thin film transistor 241 is electrically connected to the corresponding data line 23, and the scanning line 22 and the data line 23 are configured to provide a signal for the thin film transistor 241.

It may be understood that the first substrate 20 may further include a data line driver (not shown), a plurality of data line leads (not shown), and a scanning line driver (not shown). The data line driver is electrically connected to the plurality of data lines 23 through the plurality of data line leads and provides corresponding data line signals for the plurality of data lines 23. The scanning line driver is electrically connected to the plurality of scanning lines 22 and provides corresponding scanning line signals for the plurality of scanning lines 22.

The pixel electrode layer 242 may be formed on the passivation layer of the corresponding thin film transistor 241, and a through hole (not shown) is provided in the passivation layer, so as to realize an electrical connection between the drain of the thin film transistor 241 and a pixel electrode (not shown) included in the corresponding pixel electrode layer 242 through the through hole. The thin film transistor 241 serves as a driving unit to control a voltage on the corresponding pixel electrode.

Each pixel unit 24 further includes a first common electrode layer 243 on the first base 21. As shown in FIG. 1, in the first implementation, the stacked structure 241*a* of the thin film transistor 241, the pixel electrode layer 242, and the first common electrode layer 243 are successively stacked on the first base 21. In another implementation, a stacking relationship among the stacked structure 241*a* of the thin film transistor 241, the pixel electrode layer 242, and the first common electrode layer 243 on the first base 21 may alternatively be adjusted according to an actual requirement.

Figure 3:
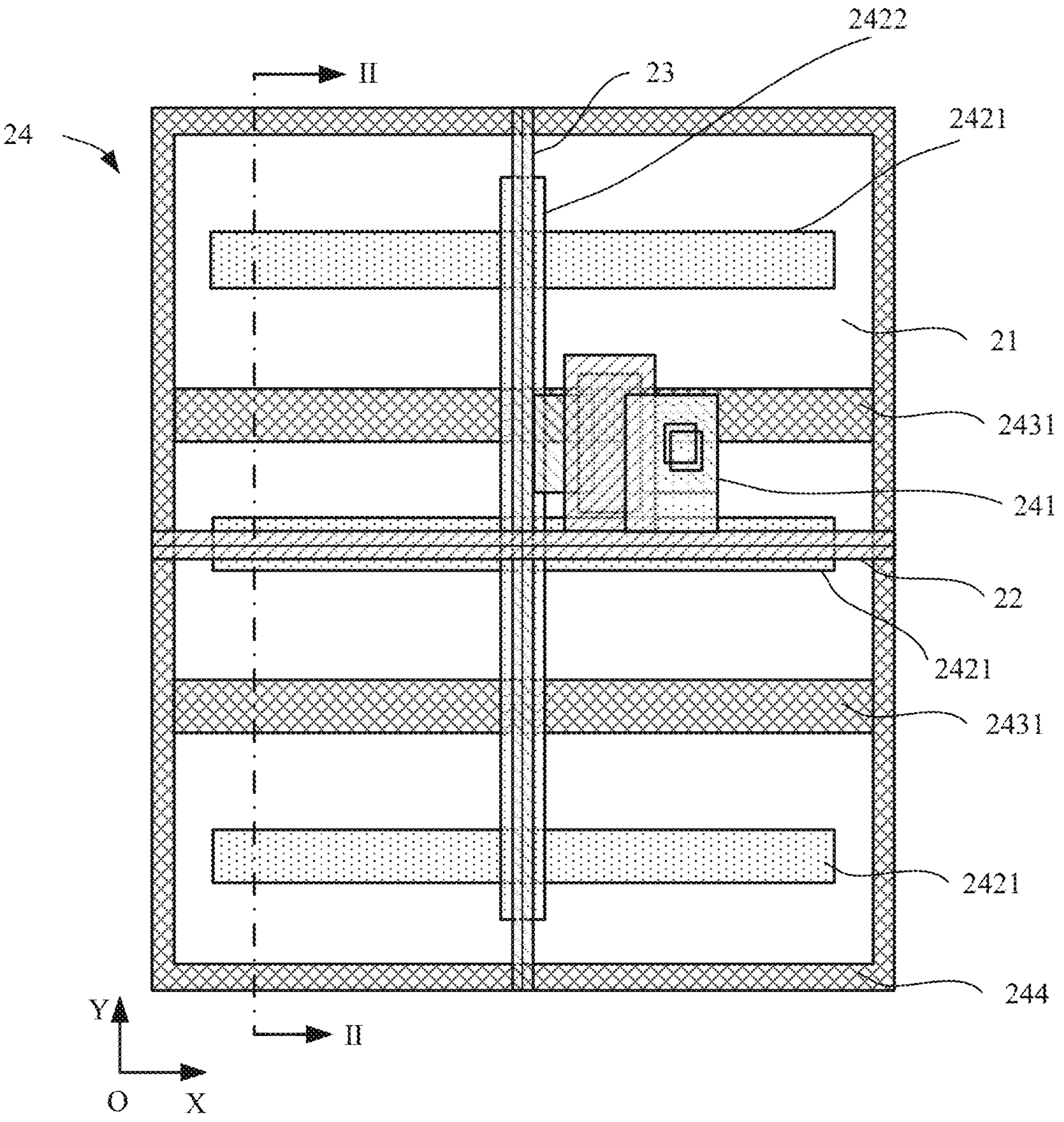
FIG. 3 is a schematic perspective view of a circuit structure corresponding to a single pixel unit according to the first implementation of this application.

FIG. 3 is a schematic perspective view of a circuit structure corresponding to a single pixel unit 24 according to the first implementation of this application. As shown in FIG. 3, each pixel unit 24 includes a first pixel electrode 2421 and a first common electrode 2431. The first pixel electrode 2421 is electrically connected to the drain of the corresponding thin film transistor 241, the first pixel electrode 2421 is formed in the pixel electrode layer 242, and the first common electrode 2431 is formed in the first common electrode layer 243.

In an implementation, as shown in FIG. 3, each pixel unit 24 includes a plurality of first pixel electrodes 2421 and a plurality of first common electrodes 2431. The plurality of first pixel electrode 2421 are electrically connected to the drain of the corresponding thin film transistor 241. In the implementation, each pixel unit 24 further includes at least one second pixel electrode 2422, and the second pixel electrode 2422 is electrically connected to the plurality of first pixel electrodes 2421 of the corresponding pixel unit 24 and the drain of the thin film transistor 241 respectively, so as to electrically connect the plurality of first pixel electrodes 2421 of the corresponding pixel unit 24 to the drain of the corresponding thin film transistor 241 respectively, thereby realizing driving of the corresponding first pixel electrodes 2421 and the second pixel electrode 2422 by the thin film transistor 241. The second pixel electrode 2422 may be arranged in a same layer structure as the first pixel electrodes 2421. In another implementation, the plurality of first pixel electrodes 2421 may alternatively be electrically connected to the drain of the corresponding thin film transistor 241 in another manner, which is not specifically limited herein. In another implementation, each pixel unit 24 may alternatively include only one first pixel electrode 2421 and one first common electrode 2431.

In the first implementation, the plurality of first pixel electrodes 2421 extend along a first direction OX and are arranged apart along a second direction OY, and the plurality of first common electrodes 2431 also extend along the first direction OX and are arranged apart along the second direction OY Each first pixel electrode 2421 is disposed between two adjacent first common electrodes 2431, or each first common electrode 2431 is disposed between two adjacent first pixel electrodes 2421. The first direction OX is perpendicular to the second direction OY, and both the first direction OX and the second direction OY are directions parallel to the first base 21. The second pixel electrode 2422 extends along the second direction OY, so as to be electrically connected to the plurality of first pixel electrodes 2421 extending along the first direction OX and arranged apart along the second direction OY and to electrically connect the plurality of first pixel electrodes 2421 to the drain of the corresponding thin film transistor 241. In another implementation, the plurality of first pixel electrodes 2421 and the plurality of first common electrodes 2431 may alternatively be arranged in another manner, provided that a driving voltage provided by the first pixel electrodes 2421 in cooperation with the first common electrodes 2431 can meet a relevant driving control requirement.

Figure 4:
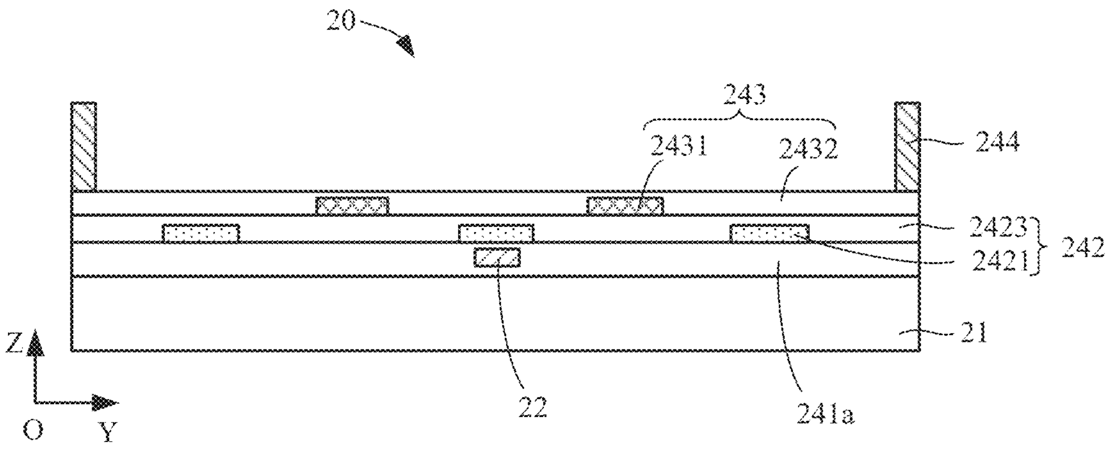
FIG. 4 is a sectional view of the structure shown in FIG. 3 along a direction II-II.

As shown in FIG. 4, in the first implementation, the pixel electrode layer 242 further includes an insulating layer 2423 covering the first pixel electrode 2421 and the second pixel electrode 2422, and the first common electrode 2431 is formed on the insulating layer 2423. The first common electrode layer 243 further includes an insulating layer 2432 covering the first common electrode 2431.

Referring to FIG. 1 and FIG. 4 together, in the first implementation, the pixel electrode layer 242, the first common electrode layer 243, and the second substrate 30 are all made of transparent materials, so that all the three can transmit light to improve display brightness of the display apparatus 101 and improve light transmittance and an aperture ratio of the display apparatus 101, thereby improving display quality of the display apparatus 101.

Specifically, the first pixel electrode 2421, the second pixel electrode 2422, and the first common electrode 2431 are all made of transparent conductive materials, such as indium tin oxide (Indium Tin Oxide, ITO). The ITO is a transparent electrode material commonly used at present, whose light transmittance can reach more than 90%. The first pixel electrode 2421, the second pixel electrode 2422, and the first common electrode 2431 are all made of the ITO, so that the first substrate 20 can meet a requirement for transparency. The insulating layers 2423 and 2432 are both made of transparent materials, such as $SiO_2$.

The scanning line 22 and the data line 23 are both made of non-transparent conductive materials, such as one or more of MO, AL, Au, TI, Nb, Cu, and alloys thereof. To further improve light transmittance and an aperture ratio of the first substrate 20, as shown in FIG. 3 and FIG. 4, in each pixel unit 24, an orthographic projection of at least one first pixel electrode 2421 on the first base 21 overlaps with an orthographic projection of the corresponding scanning line 22 on the first base 21, and an orthographic projection of at least one second pixel electrode 2422 on the first base 21 overlaps with an orthographic projection of the corresponding data line 23 on the first base 21. It may be understood that, in another implementation, the at least one second pixel electrode 2422 or the first common electrode 2431 may alternatively overlap with the corresponding scanning line 22, and the at least one first pixel electrode 2421 overlaps with the corresponding data line 23, which is not specifically limited in this application.

Referring to FIG. 1 again, the second substrate 30 includes a second base 31 disposed opposite the first base 21. The second base 31 is made of a transparent material such as glass or quartz, enabling the second base 31 to transmit light, so that the second substrate 30 meets the requirement for transparency.

In the first implementation, the electronic ink layer 40 includes a plurality of microcup units 41 in one-to-one correspondence to the plurality of pixel units 24. Each microcup unit 41 includes at least one microcup 411, and electrophoretic particles 412 and a transparent electrophoretic fluid (not shown) are encapsulated in each microcup 411. The electrophoretic particles 412 included in each microcup 411 can show one color or several different colors, and the electrophoretic particles 412 in different colors included in a same microcup 411 have different electrical properties. In FIG. 1, illustration is based on an example in which each microcup unit 41 includes a microcup 411 and the microcup 411 includes black particles and white particles. Electrical properties of the black particles are opposite to those of the white particles. For example, if the electrical properties of the black particles are positive, the electrical properties of the white particles are negative. If the electrical properties of the black particles are negative, the electrical properties of the white particles are positive.

Figure 5A:
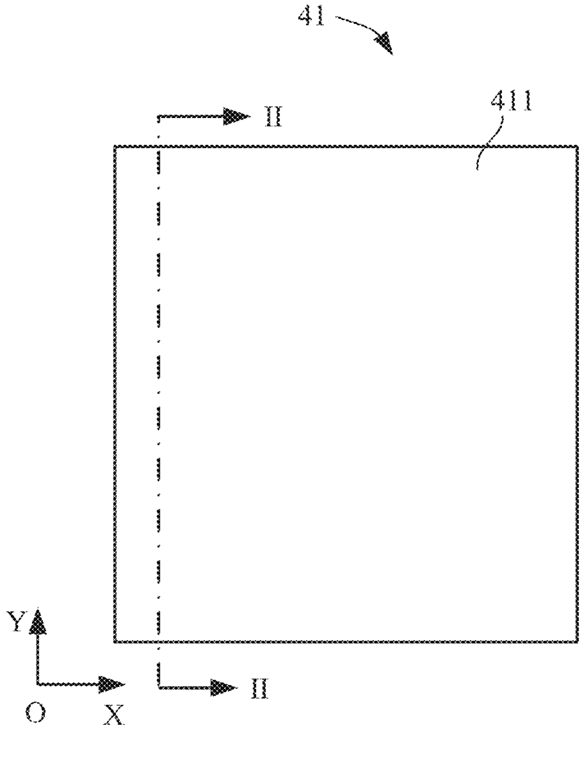
FIG. 5*a* is a schematic diagram of a plane layout structure of a microcup included in a microcup unit corresponding to the pixel unit shown in FIG. 3 in the display apparatus.
Figure 5B:
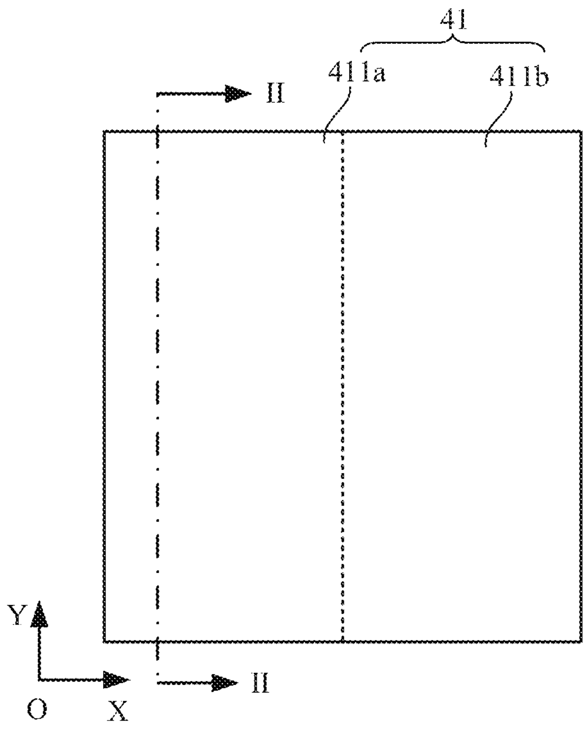
FIG. 5*b* is a schematic diagram of another plane layout structure of the microcup included in the microcup unit corresponding to the pixel unit shown in FIG. 3 in the display apparatus.
Figure 5C:
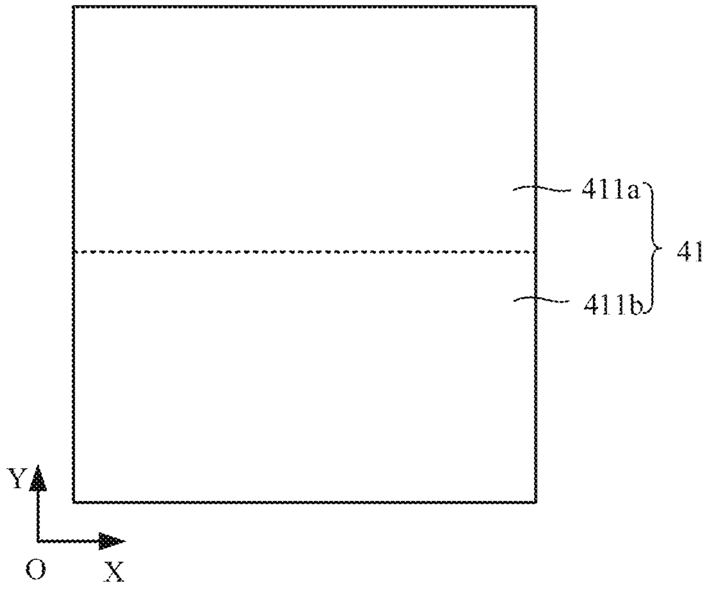
FIG. 5*c* is a schematic diagram of yet another plane layout structure of the microcup included in the microcup unit corresponding to the pixel unit shown in FIG. 3 in the display apparatus.
Figure 5D:
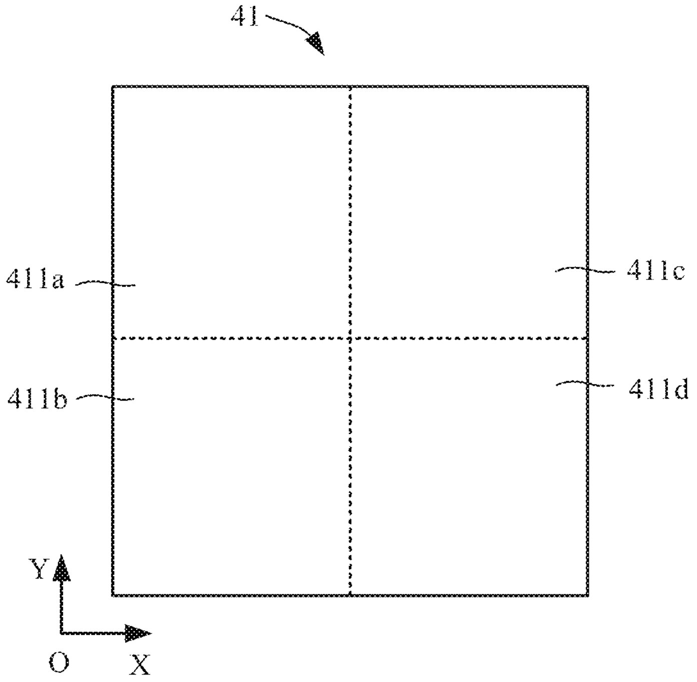
FIG. 5*d* is a schematic diagram of still another plane layout structure of the microcup included in the microcup unit corresponding to the pixel unit shown in FIG. 3 in the display apparatus.

It should be noted that, in the display apparatus 101 provided in this application, the electrophoretic particles 412 included in each microcup 411 are not limited to the black particles and/or the white particles, and particles in other colors, such as red, green, and blue, may alternatively be included, so as to improve the display effect of the display apparatus 101. A quantity of the microcup 411 included in each microcup unit 41 is not limited to one. For example, corresponding to the pixel unit 24 shown in FIG. 3, as shown in FIG. 5*a*, the microcup unit 41 may include only one microcup 411. Optionally, as shown in FIG. 5*b*, the microcup unit 41 may include two microcups 411*a* and 411*b* arranged along the first direction OX. Optionally, as shown in FIG. 5*c*, the microcup unit 41 may include two microcups 411*a* and 411*b* arranged along the second direction OY Optionally, as shown in FIG. 5*d*, the microcup unit 41 may include four microcups 411*a*, 411*b*, 411*c*, and 411*d* arranged in a matrix. Optionally, the microcup unit 41 may alternatively include a larger quantity of microcups 411, which is not exemplified one by one herein and may specifically be adjusted according to an actual requirement. It may be understood that, when the microcup unit 41 includes only one microcup 411, the microcup 411 corresponds to all the first pixel electrodes 2421 and all the first common electrodes 2431 included in the pixel unit 24. When the microcup unit 41 includes two or more microcup 411, each microcup 411 corresponds to at least one first pixel electrode 2421 and at least one first common electrode 2431 included in the pixel unit 24. In this way, the microcup 411 can be separately controlled.

The electrophoretic particles 412 included in each microcup 411 are not limited to the black particles and/or the white particles, and particles in other colors, such as red, green, and blue, may alternatively be included, so as to improve the display effect of the display apparatus 101. It may be understood that, in the implementation shown in FIG. 1, to show the electrophoretic particles 412 more clearly, the electrophoretic particles 412 are enlarged in volume and reduced in density. In an actual product, the electrophoretic particles 412 are smaller and denser.

Referring to FIG. 1 again, adjacent microcup units 41 are not communicated with each other, and accordingly, the first substrate 20 further includes a plurality of barrier walls 244. In the first implementation, the barrier walls 244 are disposed on the first common electrode layer 243 and form a plurality of barrier regions (not shown). The plurality of barrier regions are in one-to-one correspondence to the plurality of pixel regions A, and the microcup unit 41 corresponding to each pixel region A is disposed in the corresponding barrier region. The barrier walls 244 may further be configured to block electric fields between adjacent pixel regions A, so as to prevent influence of disordered electric fields on normal display of the pixel unit 24, thereby more accurately controlling the electrophoretic particles in each microcup unit 41 of the electronic ink layer 40 to move, so as to improve the display effect. It may be understood that, in a case that each microcup unit 41 includes a plurality of microcups 411, the barrier walls 244 may also be disposed between adjacent microcups 411.

Figure 6A:
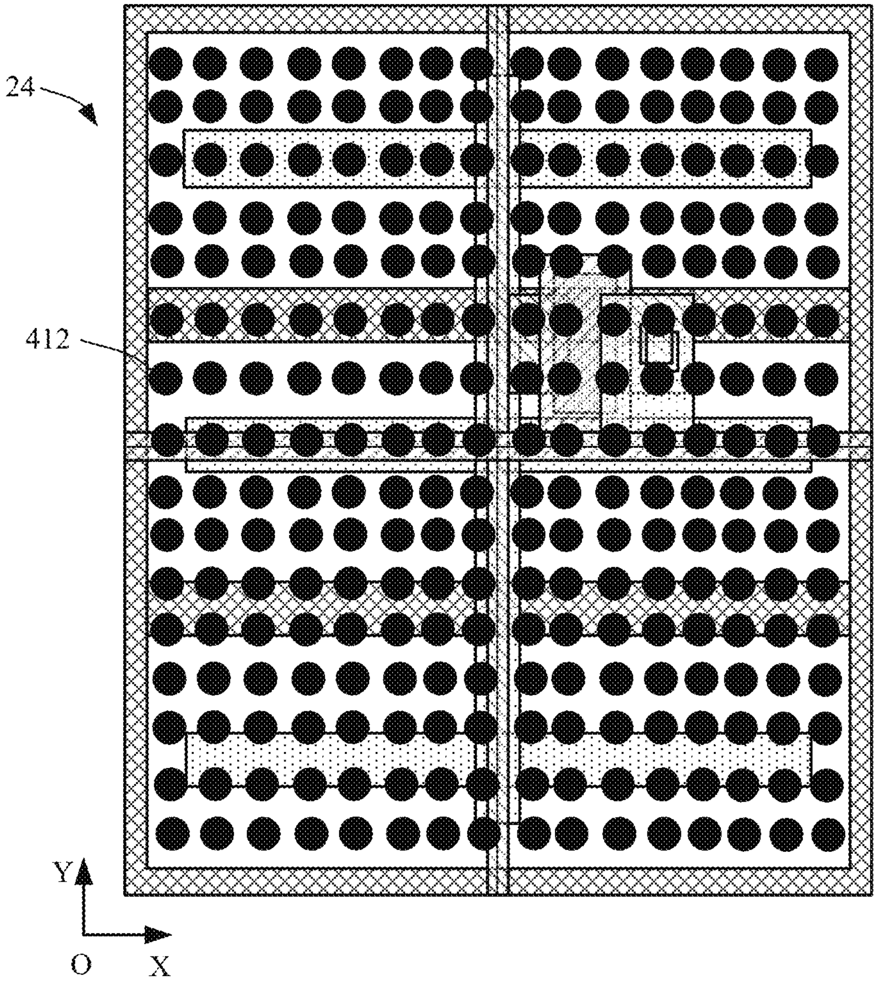
FIG. 6*a* is a schematic diagram of arrangement of color-rendering electrophoretic particles included in the microcup when the pixel unit is in a non-transmissive display mode.
Figure 6B:
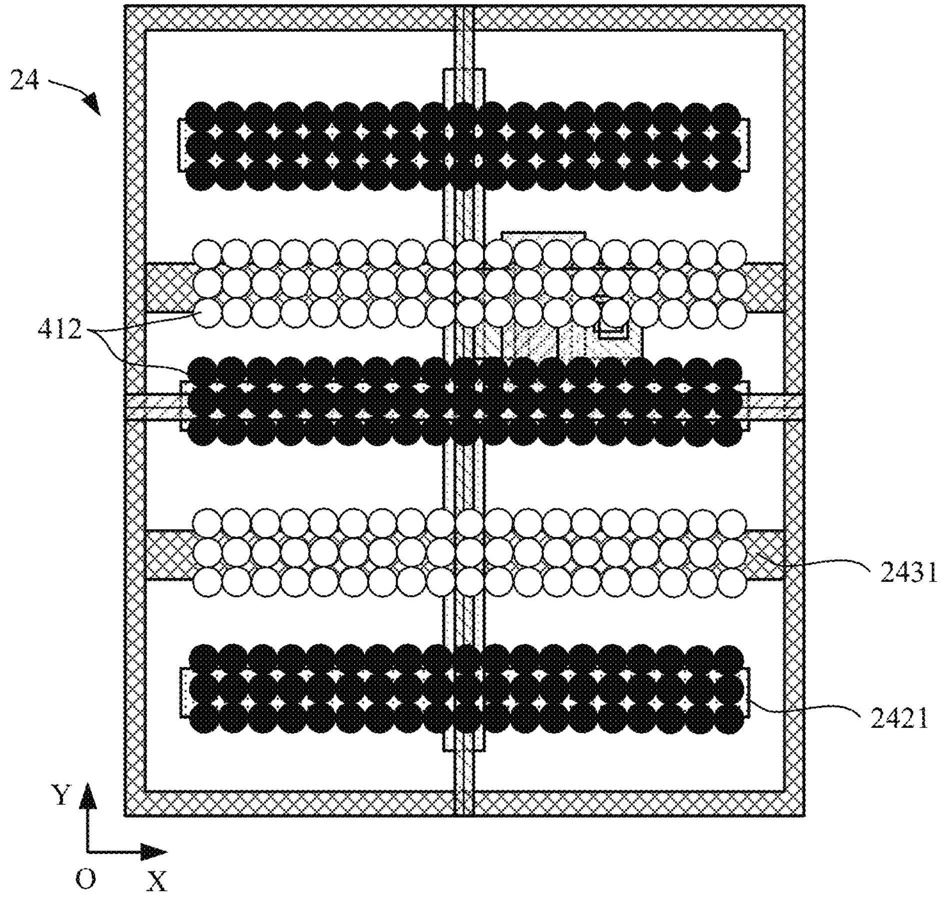
FIG. 6*b* is a schematic diagram of arrangement of two types of electrophoretic particles included in the microcup when the pixel unit is in a transmissive display mode.
Figure 6C:
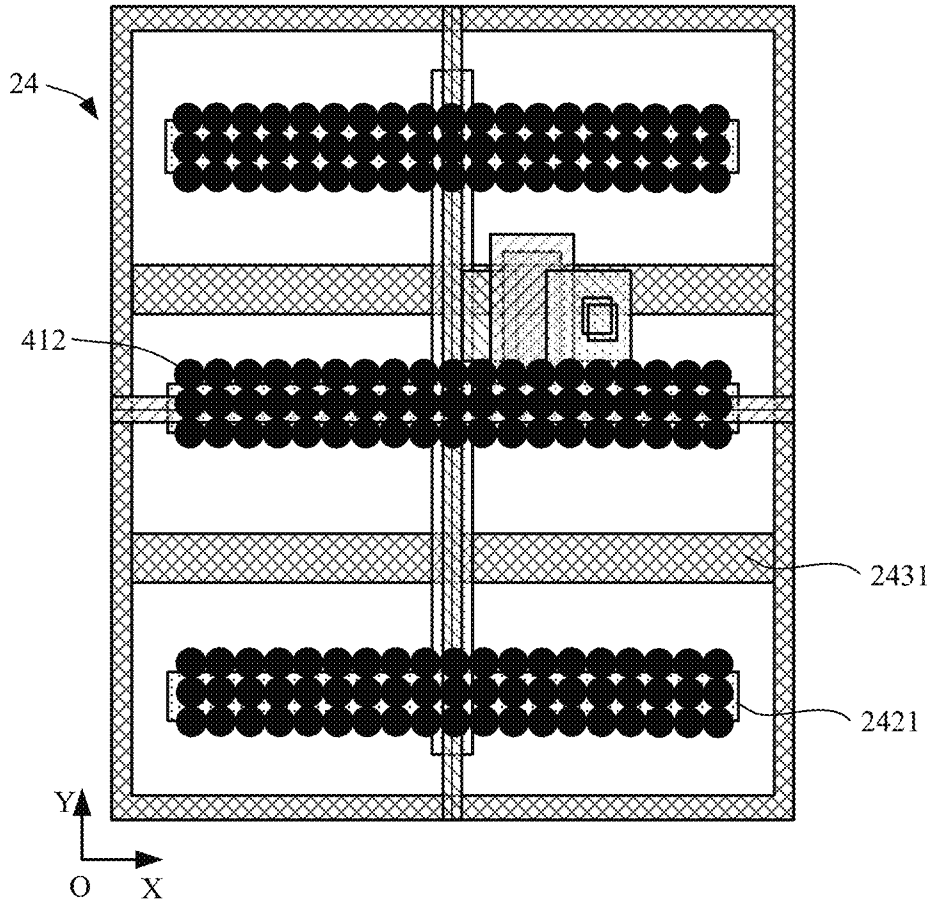
FIG. 6*c* is a schematic diagram of arrangement of one type of electrophoretic particles included in the microcup when the pixel unit is in the transmissive display mode.

In this application, a display mode of each pixel unit 24 includes a transmissive display mode and a non-transmissive display mode (i.e., a color-rendering mode). When the pixel unit 24 is in the non-transmissive display mode, as shown in FIG. 6*a*, the electrophoretic particles 412 in the corresponding microcup 411 are dispersed in the electrophoretic liquid, preventing passage of light, so that the pixel unit 24 is in a non-transmissive state, and colors of the electrophoretic particles 412, such as black, white, or other colors, are displayed. When the pixel unit 24 is in the transmissive display mode, as shown in FIG. 6*b* or FIG. 6*c*, the first pixel electrode 2421 and/or the first common electrode 2431 attract the electrophoretic particles 412 in the corresponding microcup 411, so that the electrophoretic particles 412 are gathered above and around the corresponding electrode, and the light can easily pass through. Therefore, the pixel unit 24 is in a transmissive state, to realize transparent display. It may be understood that the plurality of pixel units 24 included in the first substrate 20 may be in a same display mode or different display modes at a same moment. For example, at the same moment, the pixel units 24 that need to display colors may be in the non-transmissive display mode, and the pixel units 24 that do not need to display colors may be in the transmissive display mode. In this way, a display surface shown by the display apparatus 101 may include an opaque pattern display region as well as a transparent non-pattern display region. Alternatively, at the same moment, all the pixel units 24 are in the transmissive display mode, so that the display apparatus 101 as a whole is rendered transparent. Alternatively, at the same moment, all the pixel units 24 are in the non-transmissive display mode, so that the display surface shown by the display apparatus 101 includes a pattern display region as well as a non-pattern display region. The non-pattern display region may render a color as a base color of the pattern region.

Figure 7A:
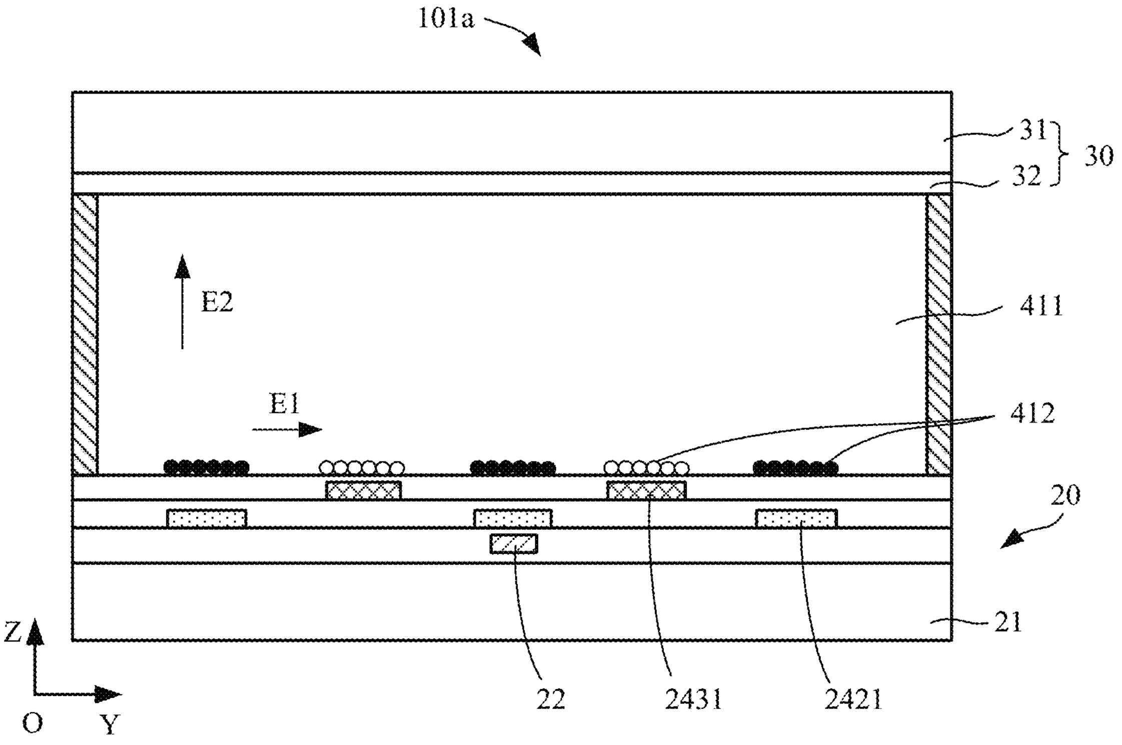
FIG. 7*a* is a sectional view of the structure shown in FIG. 5*a* or FIG. 5*b* along the direction II-II.

Specifically, in an implementation, as shown in FIG. 7*a* which is a sectional view of the structure shown in FIG. 5*a* or FIG. 5*b* along the direction II-II, that is, a sectional view of a structure of a display apparatus 101*a* corresponding to a single microcup 411. The second substrate 30 of the display apparatus 101*a* may further include a second common electrode 32 disposed on the second base 31. The second common electrode 32 is located between the second base 31 and the electronic ink layer 40. The second common electrode 32 may be a whole-layer structure. That is, the second common electrodes 32 corresponding to the microcup units 41 are connected to each other, so as to facilitate a manufacturing process. Optionally, the second common electrodes 32 corresponding to the microcup units 41 may alternatively be independent of each other. That is, the second substrate 30 includes a plurality of second common electrodes 32, which is not limited in this application.

The second common electrode 32 is a transparent conductive film made of a transparent conductive material, such as indium tin oxide (ITO). That is, the second common electrode 32 can transmit light, so as not to affect the transmittance of the display apparatus 101*a*. The second substrate 30 may further include an insulating layer (not shown) covering the second common electrode 32, and the insulating layer is also made of a transparent material, such as $SiO_2$.

In the implementation, each microcup unit 41 includes at least one microcup 411, and each microcup 411 may include at least two types of electrophoretic particles 412 with different colors and electrical properties. Alternatively, each microcup unit 41 includes at least two microcups 411 and electrophoretic particles 412 in at least two colors, and each microcup 411 includes electrophoretic particles in only one color.

In FIG. 7*a*, one microcup 411 and surrounding structures thereof are illustrated based on an example in which each microcup 411 includes black particles and white particles. Based on the structure of the display apparatus 101*a* shown in FIG. 7*a*, when the pixel unit 24 is in the non-transmissive display mode, the first pixel electrode 2421 and the first common electrode 2431 are configured to generate a first driving electric field E1 in the corresponding microcup 411, that is, an electric field distributed along the second direction OY (a direction parallel to the first base 21), to control the electrophoretic particles 412 in the corresponding microcup 411 to move along the second direction OY, so that the electrophoretic particles 412 are evenly dispersed in an electrophoretic fluid. For example, a reference voltage of 15 V may be applied to the first common electrode 2431, and voltages of 0 V and 30 V may be alternately applied to the first pixel electrode 2421, thereby alternately generating positive and negative voltages between the first common electrode 2431 and the first pixel electrode 2421, and forming, in the microcup 411, positive and negative electric fields that are transverse and alternately change directions to vibrate the electrophoretic particles 412 back and forth, so that the electrophoretic particles 412 are evenly dispersed in the electrophoretic fluid. The voltage of the first pixel electrode 2421 may be changed through driving control of the corresponding thin film transistor 241.

The first pixel electrode 2421 and the second common electrode 32 are configured to generate a second driving electric field E2 in the corresponding microcup 411, that is, an electric field distributed along a third direction OZ (a direction perpendicular to the first base 21 and the second base 31), to cause the electrophoretic particles 412 in the corresponding microcup 411 to move towards the first pixel electrode 2421 or the second common electrode 32 according to electrical properties of the electrophoretic particles and an electric field direction of the second driving electric field E2. The electrophoretic particles 412 that need to participate in color rendering move to the top of the corresponding microcup 411, that is, near the second common electrode 32, and the electrophoretic particles 412 that do not participate in the color rendering move to the bottom of the corresponding microcup 411, that is, near the first pixel electrode 2421, so that the corresponding microcup 411 renders black, white, or other colors. For example, as shown in FIG. 7*a*, each microcup 411 includes black particles and white particles. When the microcup 411 needs to render black, as shown in FIG. 6*a*, the black particles are dispersed in the electrophoretic fluid and tiled on the top of the microcup 411 for color rendering, while the white particles move to the bottom of the microcup 411. When the microcup 411 needs to render white, the white particles are dispersed in the electrophoretic fluid and tiled on the top of the microcup 411 for color rendering, while the block particles move to the bottom of the microcup 411.

It may be understood that, after the electrophoretic particles 412 participating in the color rendering are evenly tiled on the top of the corresponding microcup 411, the electric field applied to each electrode can be removed, that is, the first common electrode 2431, the second common electrode 32, and the first pixel electrode 2421 are powered off, so that the electrophoretic particles 412 remain evenly tiled on the top of the corresponding microcup 411.

Figure 7B:
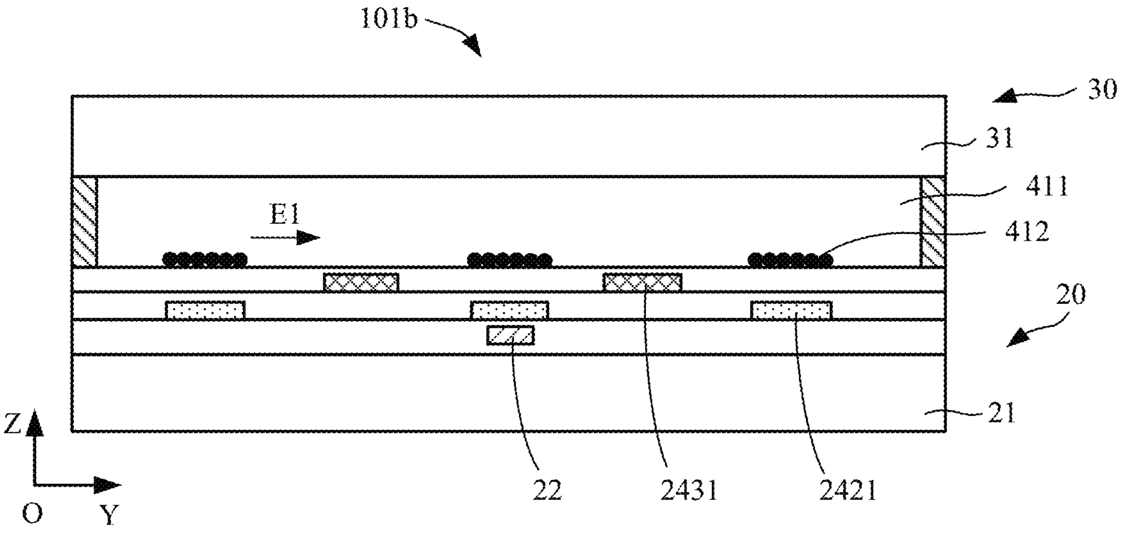
FIG. 7*b* is another sectional view of the structure shown in FIG. 5*a* or FIG. 5*b* along the direction II-II.

In another implementation, as shown in FIG. 7*b* which is another sectional view of the structure shown in FIG. 5*a* or FIG. 5*b* along the direction II-II, that is, a sectional view of another structure of the display apparatus 101*a* corresponding to the single microcup 411. The second substrate 30 of the display apparatus 101*b* includes only the second base 31, but is not provided with the second common electrode 32. Each microcup unit 41 includes electrophoretic particles 412 in only one color.

In FIG. 7*b*, one microcup 411 and surrounding structures thereof are illustrated based on an example in which each microcup 411 includes black particles. Based on the structure of the display apparatus 101*b* shown in FIG. 7*b*, when the pixel unit 24 is in the non-transmissive display mode, the first pixel electrode 2421 and the first common electrode 2431 are configured to generate a first driving electric field E1 in the corresponding microcup 411, that is, an electric field distributed along the second direction OY (a direction parallel to the first base 21), to control the electrophoretic particles 412 in the corresponding microcup 411 to move along the second direction OY, so that the electrophoretic particles 412 are evenly dispersed in an electrophoretic fluid in the corresponding microcup 411 for color rendering, thereby causing the corresponding microcup 411 to render the color of the electrophoretic particles 412 (as shown in FIG. 6*a*).

When the pixel unit 24 is in the transmissive display mode, the first pixel electrode 2421 and/or the first common electrode 2431 included in the pixel unit 24 are/is configured to attract the electrophoretic particles 412 in the corresponding microcup 411 in an on state, so that the electrophoretic particles 412 are gathered above and around the corresponding electrodes. Specifically, when there is a need to realize the transmissive display mode of the pixel unit 24, a relevant control principle is roughly as follows:

If the microcup 411 includes two types of electrophoretic particles with different colors and different electrical properties, based on the structure of the display apparatus 101*a* shown in FIG. 7*a*, when the pixel unit 24 is in the transmissive display mode, a first voltage is applied to the first pixel electrode 2421, so that one type of the electrophoretic particles in the microcup 411 are gathered above and around the first pixel electrode 2421. A second voltage is applied to the first common electrode 2431, so that the other type of the electrophoretic particles in the microcup 411 are gathered above and around the first common electrode 2431. In this way, the pixel unit 24 can be rendered transparent. For example, as shown in FIG. 6*b*, each microcup 411 includes black particles and white particles, and electrical properties of the black particles and the white particles are different. When the pixel unit 24 is in the transmissive display mode, the first voltage is applied to the first pixel electrode 2421, so that the black particles in the microcup 411 are gathered above and around the first pixel electrode 2421. The second voltage is applied to the first common electrode 2431, so that the white particles in the microcup 411 are gathered above and around the first common electrode 2431. In this way, the pixel unit 24 can be rendered transparent.

If the microcup 411 includes electrophoretic particles in only one color, based on the structure of the display apparatus 101*a* shown in FIG. 7*a* or the structure of the display apparatus 101*b* shown in FIG. 7*b*, when the pixel unit 24 is in the transmissive display mode, a reference voltage is applied to one of the first pixel electrode 2421 and the first common electrode 2431, and a voltage opposite to the electrical properties of the electrophoretic particles 412 is applied to the other electrode, so that the electrophoretic particles 412 in the microcup 411 are gathered above and around the other electrode. In this way, the pixel unit 24 can be rendered transparent. For example, as shown in FIG. 6*c*, the reference voltage is applied to the first common electrode 2431, and the voltage opposite to the electrical properties of the electrophoretic particles 412 is applied to the first pixel electrode 2421, so that the electrophoretic particles 412 are gathered above and around the first pixel electrode 2421.

It may be understood that, after the electrophoretic particles 412 are gathered above and around the first pixel electrode 2421 or the first common electrode 2431, the electric field applied to each electrode can be removed, that is, the first common electrode 2431 and the first pixel electrode 2421 are powered off, so that the electrophoretic particles 412 remain gathered above and around the first pixel electrode 2421 or the first common electrode 2431.

In the implementation shown in FIG. 7*a* or FIG. 7*b*, when the pixel unit 24 is in the non-transmissive display mode, to ensure that the electrophoretic particles 412 can be evenly dispersed in the electrophoretic fluid, the first pixel electrode 2421 and the first common electrode 2431 are generally wider to ensure certain electric field strength. In addition, above the first pixel electrode 2421 and the first common electrode 2431, that is, the bottom of the microcup 411, is a plane, which causes the electrophoretic particles 412 in the transmissive display mode to be gathered above and around the electrodes and tiled at the bottom of the microcup 411 (as shown in FIG. 6*b*, FIG. 6*c*, FIG. 7*a*, and FIG. 7*b*), occupying a larger area of a display surface of the pixel unit 24, thereby blocking more light and resulting in low transmittance of the pixel unit 24.

Figure 8A:
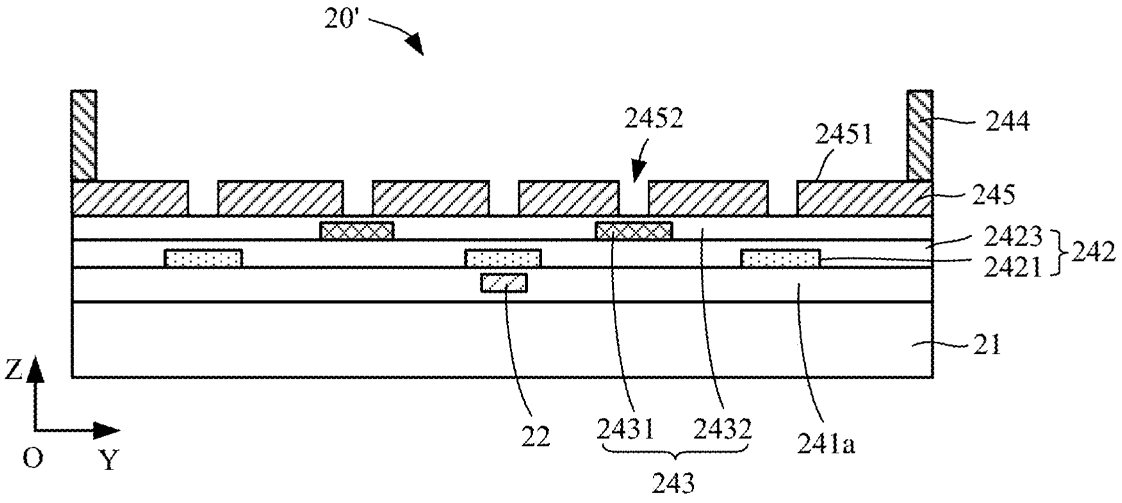
FIG. 8*a* is a sectional view of a structure of a first substrate according to a second implementation of this application.
Figure 8B:
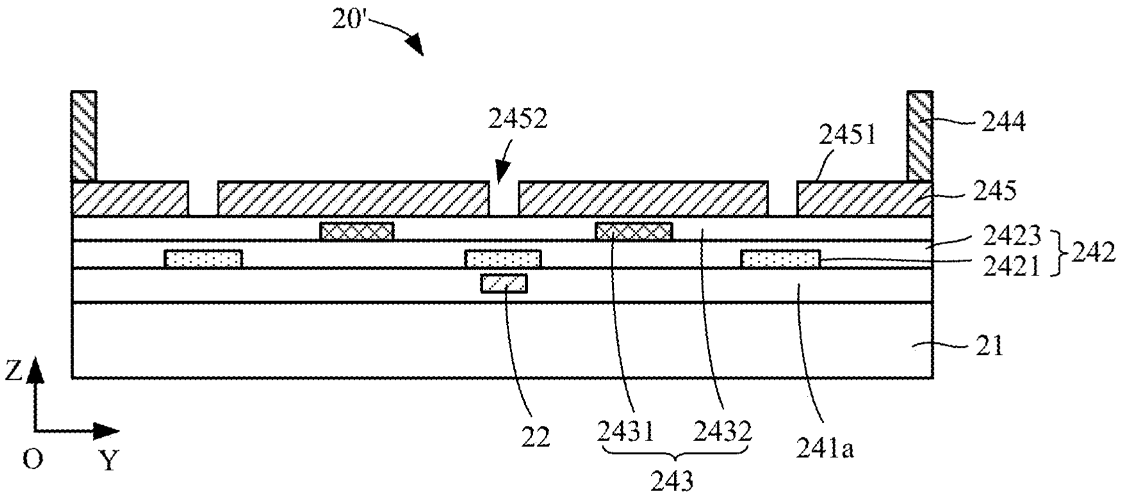
FIG. 8*b* is a sectional view of another structure of the first substrate according to the second implementation of this application.
Figure 8C:
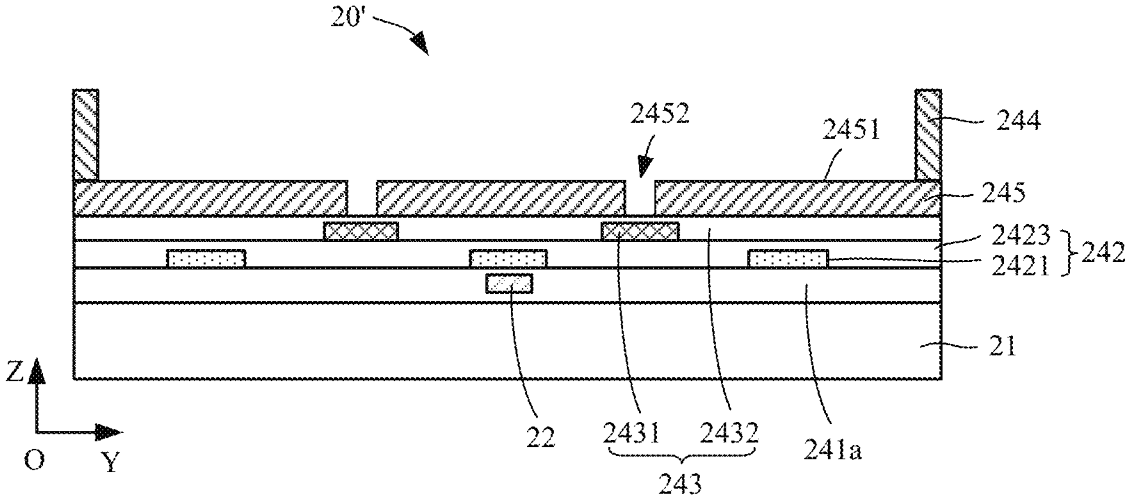
FIG. 8*c* is a sectional view of yet another structure of the first substrate according to the second implementation of this application.

To improve the transmittance of the pixel unit 24 in the transmissive display mode, as shown in FIG. 8*a* to FIG. 8*c*, this application further provides a first substrate 20' according to a second implementation. A structure of the first substrate 20' provided in the second implementation is similar to that of the first substrate 20 shown in FIG. 4, and differences are as follows: The first substrate 20' provided in the second implementation further includes an insulating layer 245 covering the first pixel electrode 2421 and the first common electrode 2431 of the pixel unit 24. A surface 2451 of the insulating layer 245 facing away from the first base 21 (i.e., a surface of the insulating layer 245 adjacent to each microcup unit 41) is provided with grooves/a groove 2452 corresponding to the first pixel electrode 2421 and/or the first common electrode 2431 of each pixel unit 24. A width of the groove 2452 is less than that of the corresponding electrode. The groove 2452 is configured to gather the electrophoretic particles 412 in the corresponding microcup 411.

The insulating layer 245 is made of a transparent material, such as resin. A length of the groove 2452 may be less than, equal to, or greater than that of the corresponding electrode. A depth of the groove 2452 may be adjusted as required, generally ranging from a few microns to tens of microns. The length and the depth of the groove 2452 are not specifically limited in this application. In a manufacturing process, the barrier walls 244 may be formed around the pixel region A in a process of forming the electronic ink layer 40, and the groove 2452 may be formed by using a nanoimprinting process at the same time.

As shown in FIG. 9*a* to FIG. 9*d*, this application further provides display apparatuses 102*a* to 102*d* according to the second implementation. Structures of the display apparatuses 102*a* to 102*d* provided in the second implementation are similar to the structure of the display apparatus 101*a* shown in FIG. 7*a*, and a difference is as follows: The display apparatuses 102*a* to 102*d* provided in the second implementation each include the first substrate 20'. That is, the first substrate 20' in the second implementation is applied to the display apparatuses 102*a* to 102*d* in the second implementation.

Figure 10A:
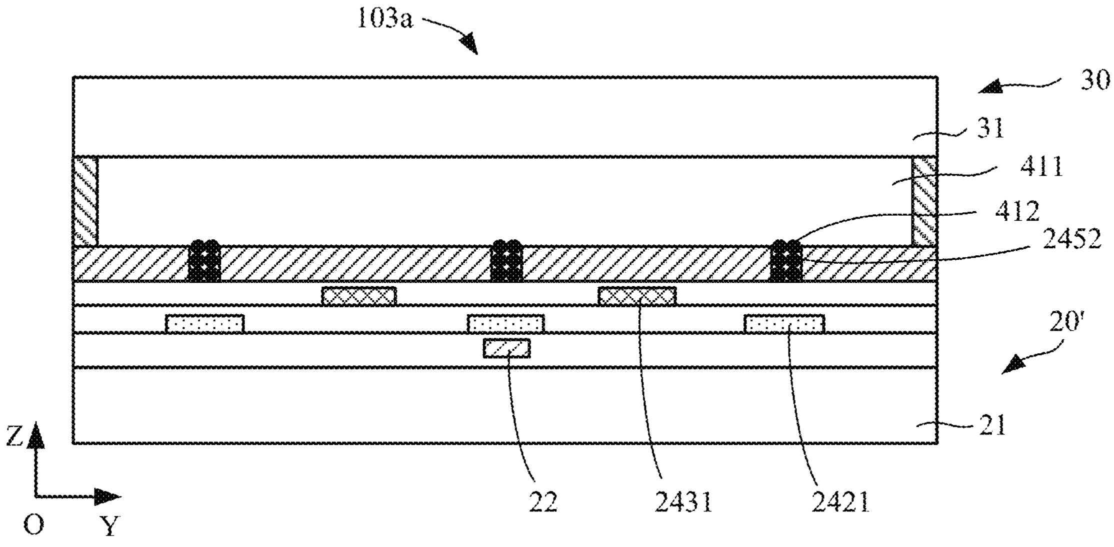
FIG. 10*a* is a sectional view of a structure of a display apparatus corresponding to a single microcup according to a third implementation of this application.
Figure 10B:
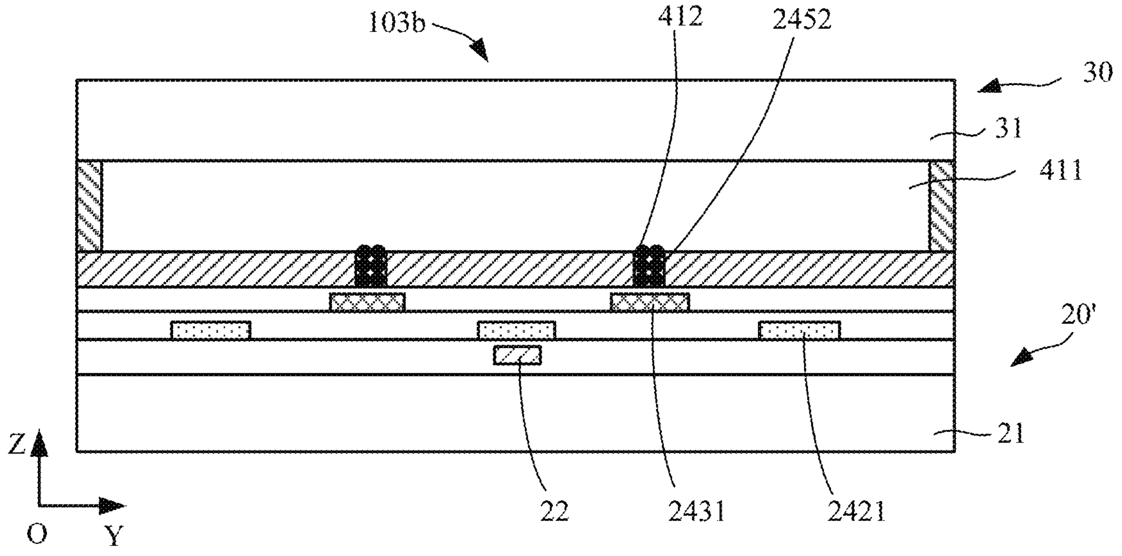
FIG. 10*b* is a sectional view of another structure of the display apparatus corresponding to the single microcup according to the third implementation of this application.
Figure 10C:
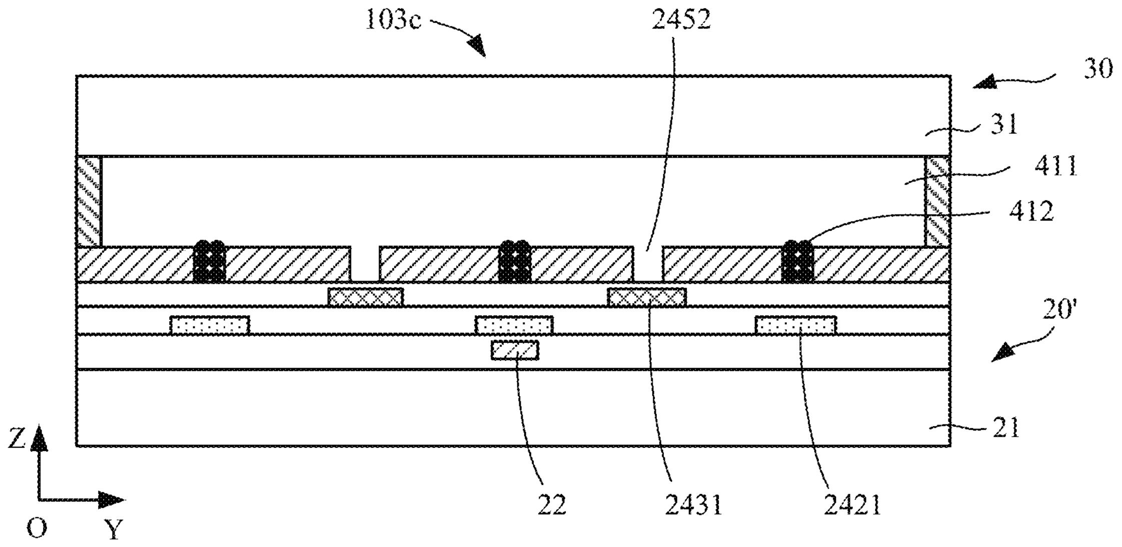
FIG. 10*c* is a sectional view of yet another structure of the display apparatus corresponding to the single microcup according to the third implementation of this application.

As shown in FIG. 10*a* to FIG. 10*c*, this application further provides display apparatuses 103*a* to 103*c* according to a third implementation. Structures of the display apparatuses 103*a* to 103*c* provided in the third implementation are similar to the structure of the display apparatus 101*b* shown in FIG. 7*b*, and a difference is as follows: The display apparatuses 103*a* to 103*c* provided in the third implementation each include the first substrate 20'. That is, the first substrate 20' in the second implementation is applied to the display apparatuses 103*a* to 103*c* in the third implementation.

In the second implementation or the third implementation, the first pixel electrode 2421 and/or the first common electrode 2431 of each pixel unit 24 are/is configured to attract the electrophoretic particles 412 in the corresponding microcup 411 when the pixel unit 24 is in the transmissive display mode, so that the electrophoretic particles 412 are gathered into the groove 2452 corresponding to the electrode.

Figure 9A:
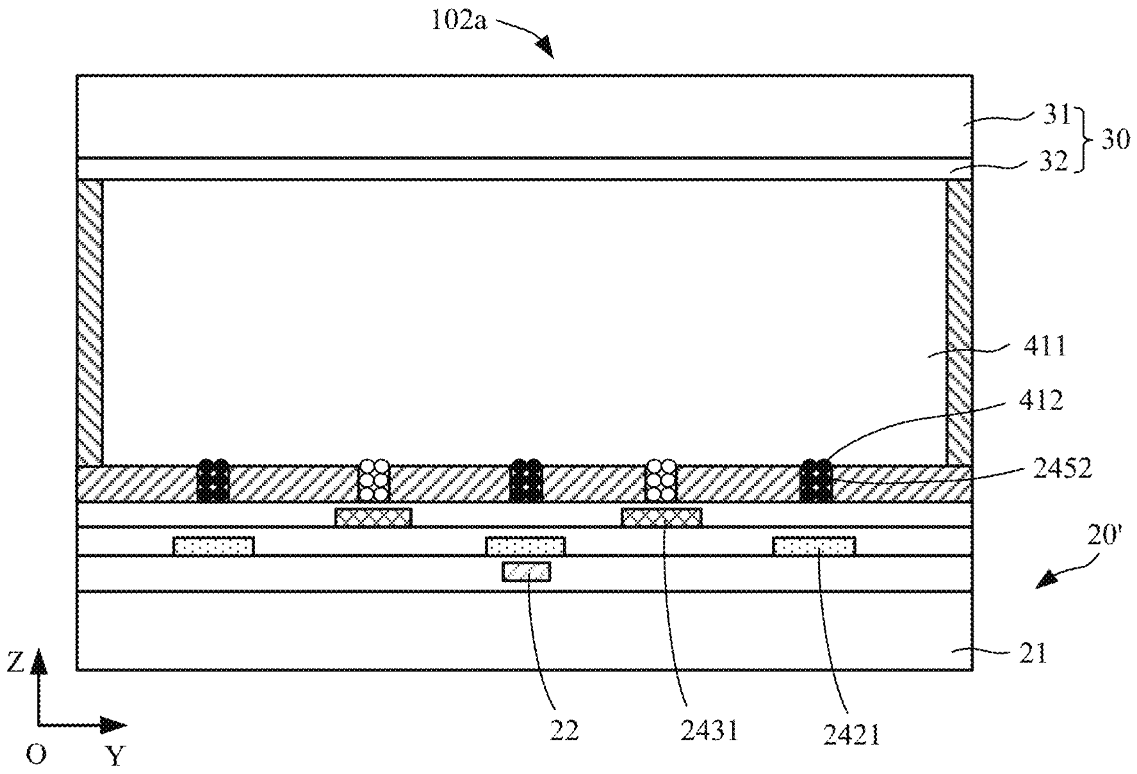
FIG. 9*a* is a sectional view of a structure of a display apparatus corresponding to a single microcup according to the second implementation of this application.
Figure 11A:
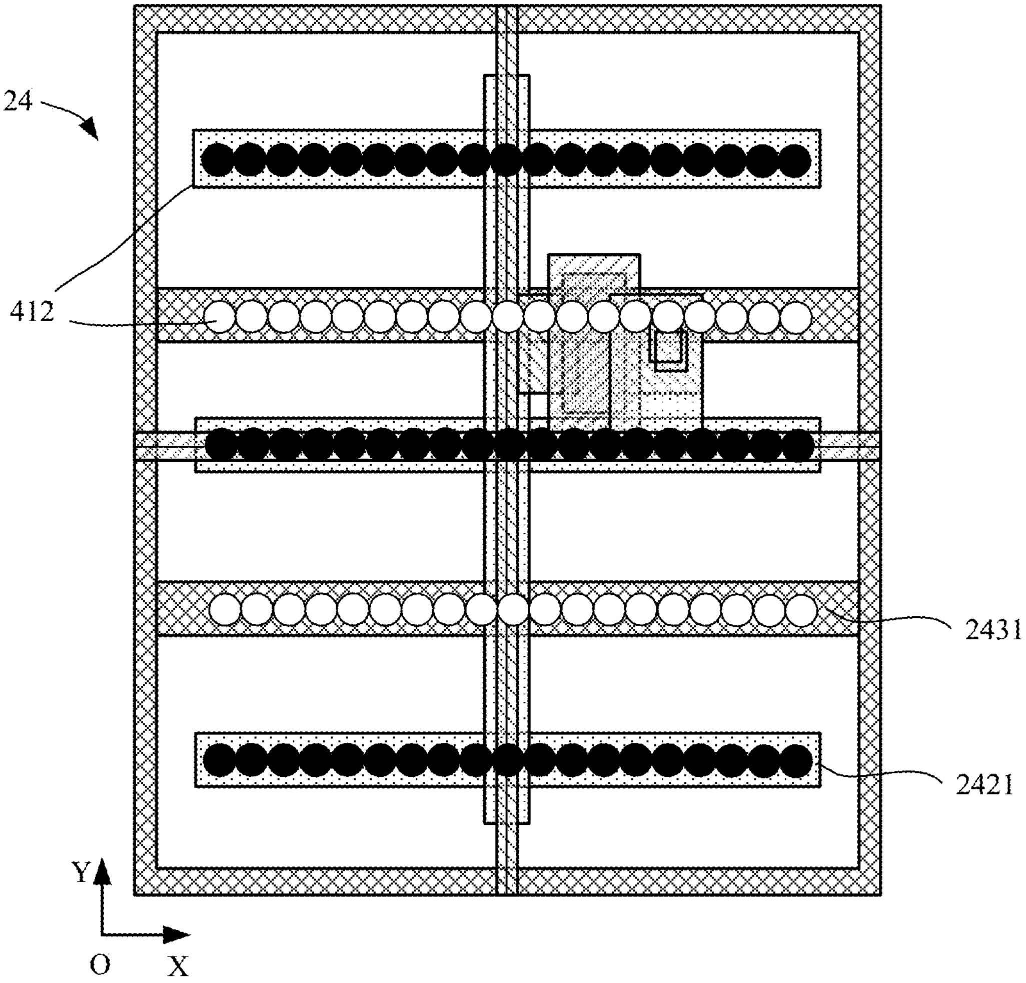
FIG. 11*a* is a schematic diagram of arrangement of two types of electrophoretic particles included in the microcup shown in FIG. 9*a* when the pixel unit is in the transmissive display mode.

Specifically, if the microcup 411 includes two types of electrophoretic particles with different colors and different electrical properties, as shown in FIG. 8*a*, the surface 2451 of the insulating layer 245 is provided with grooves 2452 respectively corresponding to the first pixel electrode 2421 and the first common electrode 2431. When the pixel unit 24 is in the transmissive display mode, as shown in FIG. 9*a* or FIG. 11*a*, the first voltage is applied to the first pixel electrode 2421, so that one type of the electrophoretic particles in the microcup 411 are gathered into the groove 2452 corresponding to the first pixel electrode 2421. The second voltage is applied to the first common electrode 2431, so that the other type of the electrophoretic particles in the microcup 411 are gathered into the groove 2452 corresponding to the first common electrode 2431. In this way, the pixel unit 24 can be rendered transparent.

If the microcup 411 includes electrophoretic particles in only one color, as shown in FIG. 8*b* or FIG. 8*c*, the surface 2451 of the insulating layer 245 is provided with the groove 2452 corresponding to the first pixel electrode 2421 or the first common electrode 2431. When the pixel unit 24 is in the transmissive display mode, the voltage opposite to the electrical properties of the electrophoretic particles 412 is applied to the electrode corresponding to the groove 2452, and the reference voltage is applied to the other electrode, so that the electrophoretic particles in the microcup 411 are gathered into the groove 2452. In this way, the pixel unit 24 can be rendered transparent.

Figure 9B:
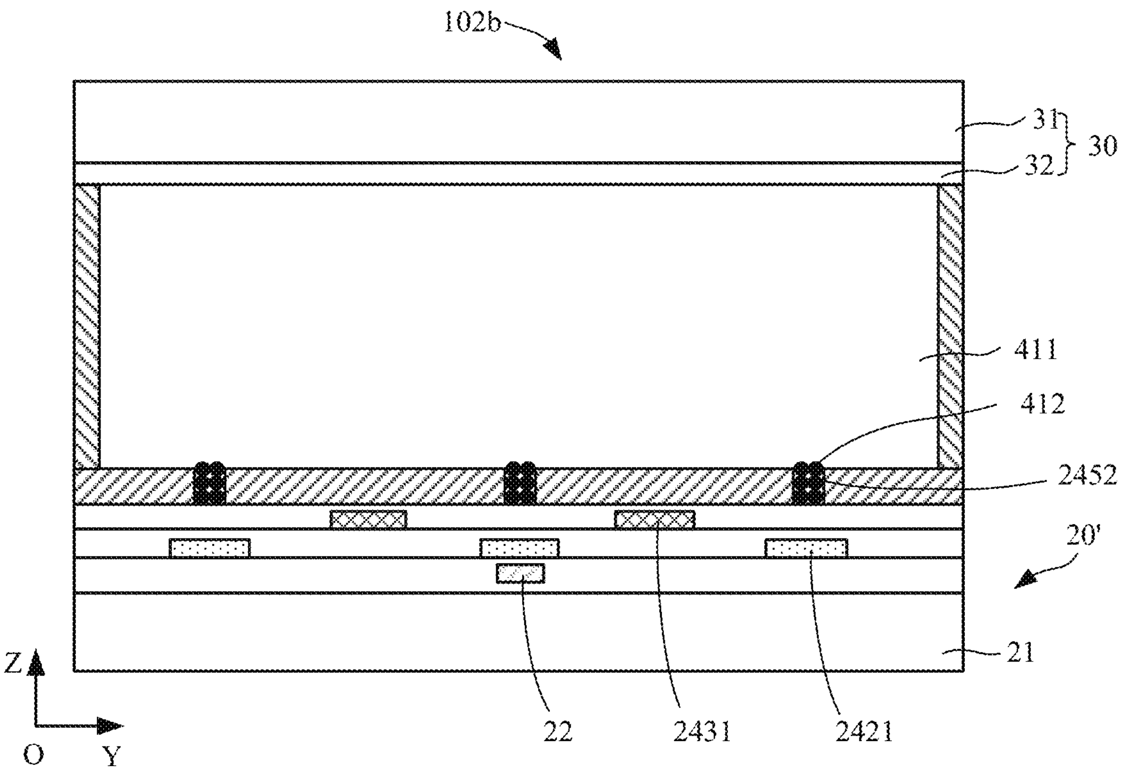
FIG. 9*b* is a sectional view of another structure of the display apparatus corresponding to the single microcup according to the second implementation of this application.
Figure 11B:
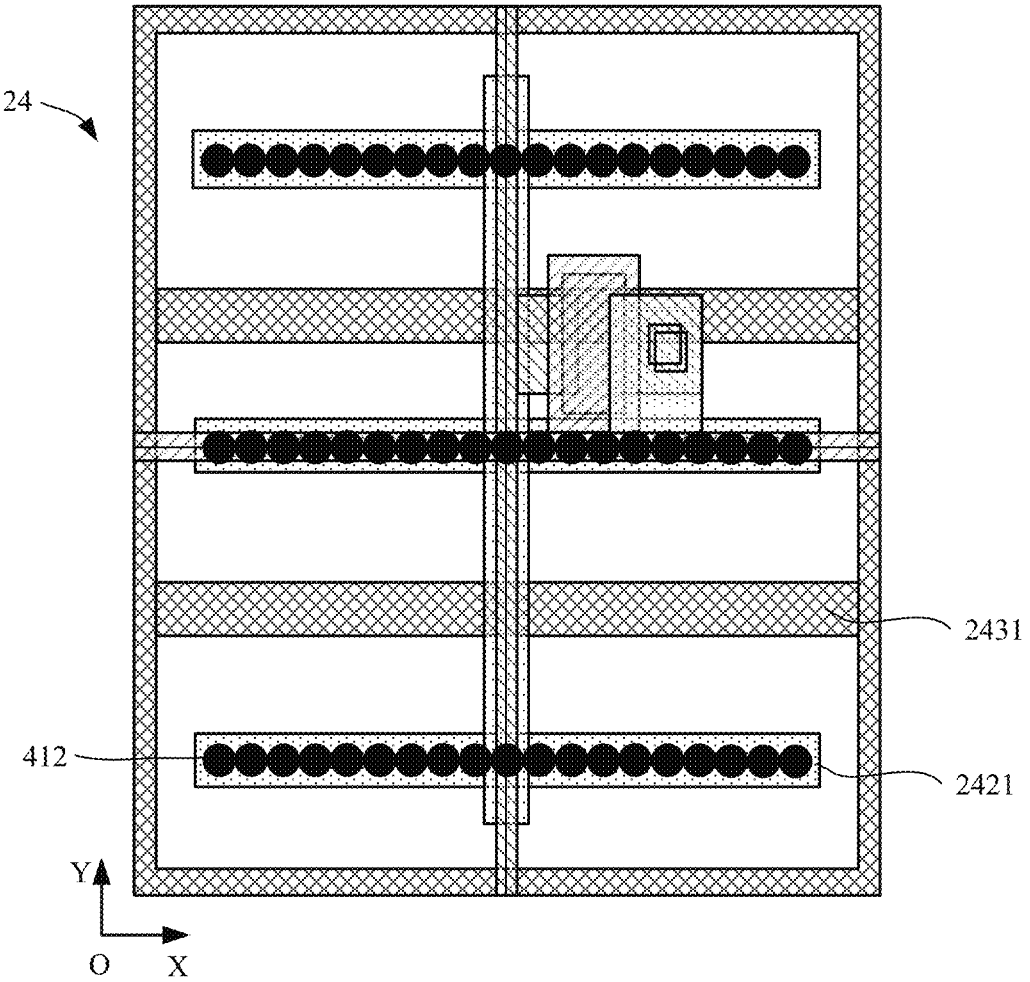
FIG. 11*b* is a schematic diagram of arrangement of one type of electrophoretic particles included in the microcup shown in FIG. 9*b* or FIG. 10*a* when the pixel unit is in the transmissive display mode.

For example, if the microcup 411 includes black particles, as shown in FIG. 9*b* or FIG. 10*a*, the surface 2451 of the insulating layer 245 is provided with only the groove 2452 corresponding to the first pixel electrode 2421. When the pixel unit 24 is in the transmissive display mode, as shown in FIG. 11*b*, the reference voltage is applied to the first common electrode 2431, and the voltage opposite to the electrical properties of the electrophoretic particles 412 is applied to the first pixel electrode 2421, so that the electrophoretic particles in the microcup 411 are gathered into the groove 2452 corresponding to the first pixel electrode 2421.

Figure 9C:
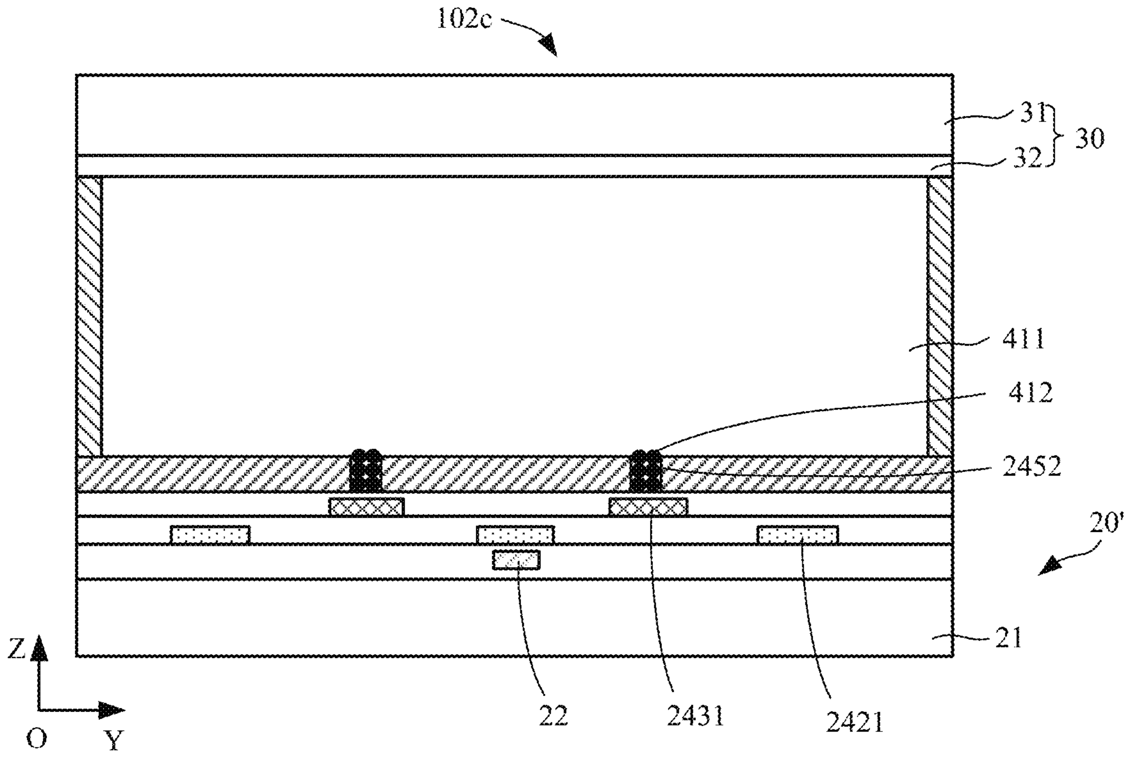
FIG. 9*c* is a sectional view of yet another structure of the display apparatus corresponding to the single microcup according to the second implementation of this application.

Optionally, as shown in FIG. 9*c* or FIG. 10*b*, the surface 2451 of the insulating layer 245 may alternatively be provided with only the groove 2452 corresponding to the first common electrode 2431. When the pixel unit 24 is in the transmissive display mode, the reference voltage is applied to the first pixel electrode 2421, and the voltage opposite to the electrical properties of the electrophoretic particles 412 is applied to the first common electrode 2431, so that the electrophoretic particles in the microcup 411 are gathered into the groove 2452 corresponding to the first common electrode 2431. In this way, the pixel unit 24 can be rendered transparent.

Figure 9D:
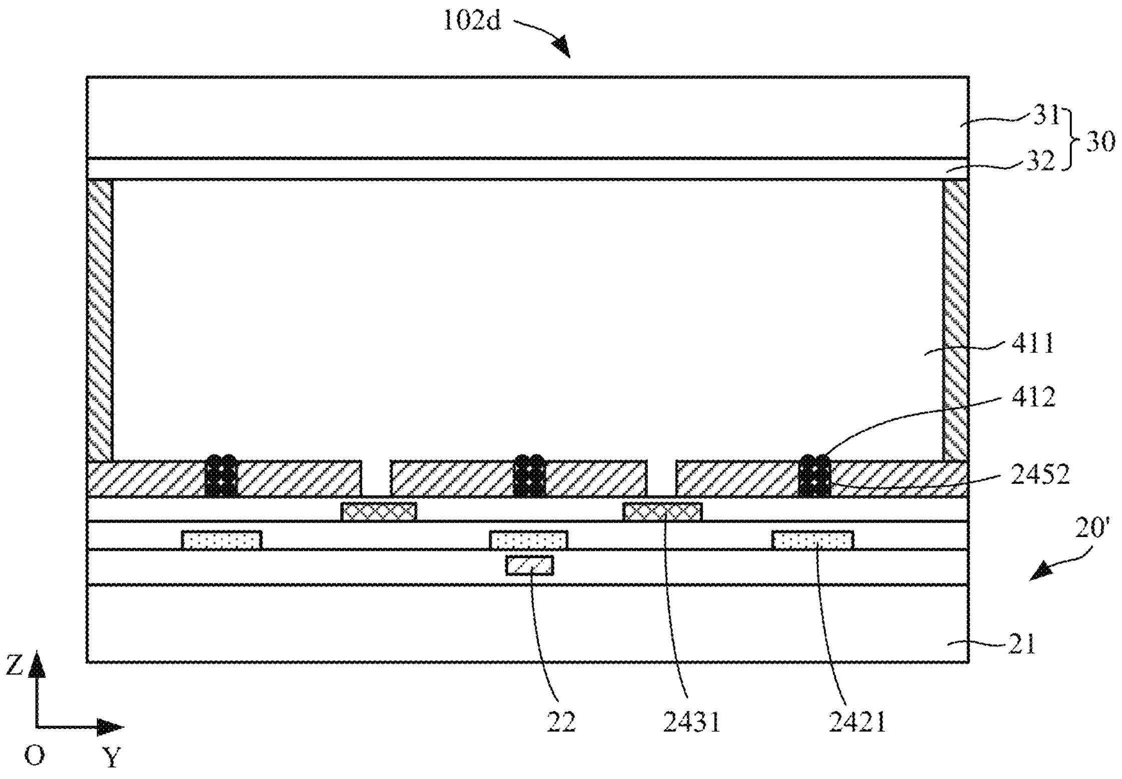
FIG. 9*d* is a sectional view of still another structure of the display apparatus corresponding to the single microcup according to the second implementation of this application.

Optionally, if the microcup 411 includes electrophoretic particles in only one color, as shown in FIG. 8*a*, FIG. 9*d*, and FIG. 10*c*, the surface 2451 of the insulating layer 245 may alternatively be provided with the grooves 2452 respectively corresponding to the first pixel electrode 2421 and the first common electrode 2431. When the pixel unit 24 is in the transmissive display mode, the reference voltage is applied to one of the first pixel electrode 2421 and the first common electrode 2431, and the voltage opposite to the electrical properties of the electrophoretic particles 412 is applied to the other electrode, so that the electrophoretic particles in the microcup 411 are gathered into the groove 2452 corresponding to the other electrode. In other words, the groove corresponding to the one electrode is in a vacant state when the pixel unit 24 is in the transmissive display mode. In this way, the pixel unit 24 can also be rendered transparent.

Display mode control principles of the pixel units 24 of the display apparatuses 102*a* to 102*d* shown in FIG. 9*a* to FIG. 9*d* are the same as the display mode control principle of the pixel unit 24 of the display apparatus 101*a* shown in FIG. 7*a*. Specific technical details may be obtained with reference to the specific introduction to the display apparatus 101*a* shown in FIG. 7*a* above. Details are not described herein.

Display mode control principles of the pixel units 24 of the display apparatuses 103*a* to 103*c* shown in FIG. 10*a* to FIG. 10*c* are the same as the display mode control principle of the pixel unit 24 of the display apparatus 101*b* shown in FIG. 7*b*. Specific technical details may be obtained with reference to the specific introduction to the display apparatus 101*b* shown in FIG. 7*b* above. Details are not described herein.

In the second and third implementations, the insulating layer 245 further covers the second pixel electrode 2422, the surface 2451 of the insulating layer 245 may be further provided with the groove 2452 corresponding to the second pixel electrode 2422, and the second pixel electrode 2422 is configured to attract the electrophoretic particles 412 in the corresponding microcup 411 when the corresponding pixel unit 24 is in the transmissive display mode, so that the electrophoretic particles 412 are gathered into the groove 2452 corresponding to the second pixel electrode 2422.

As can be seen from the above, in the first implementation, when no groove is disposed above the first pixel electrode 2421, the second pixel electrode 2422, and the first common electrode 2431, the bottom of the microcup 411 is a planar design. As shown in FIG. 6*a* or FIG. 6*b*, the electrophoretic particles 412 in the transmissive display mode are gathered and tiled above and around the first pixel electrode 2421 and/or the first common electrode 2431, and the gathered electrophoretic particles 412 occupy a larger area of the display surface of the pixel unit 24, thereby blocking more light and resulting in low transmittance of the pixel unit 24.

In contrast, in the second and third implementations, when the groove 2452 is disposed above the first pixel electrode 2421 and/or the first common electrode 2431, due to the existence of the groove 2452, the bottom of the microcup 411 is a three-dimensional design. As shown in FIG. 11*a* or FIG. 11*b*, the electrophoretic particles 412 are gathered above the first pixel electrode 2421 and/or the first common electrode 2431 when the pixel unit 24 is in the transmissive display mode, and are trapped in the groove 2452 for longitudinal arrangement. Since the width of the groove 2452 is less than that of the corresponding electrode and the electrophoretic particles 412 are longitudinally arranged in the groove 2452, the gathered electrophoretic particles 412 occupy only a small area of the display surface of the pixel unit 24, which can reduce a light shielding area, thereby effectively reducing shielding of light by the gathered electrophoretic particles, and can significantly improve transmittance of the pixel unit 24, enabling the display apparatus to achieve a good transparent display effect.

It may be understood that the groove 2452 is also disposed above the second pixel electrode 2422, which can further improve the transmittance of the pixel unit 24 and the transparent display effect of the display apparatus.

Figure 12A:
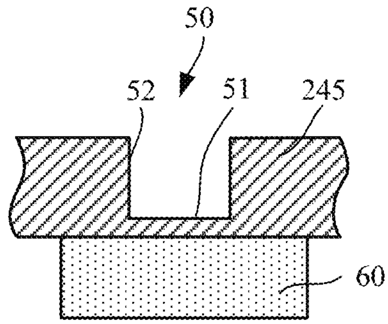
FIG. 12*a* is a structural sectional view of a groove according to the first implementation of this application.

As shown in FIG. 12*a*, the first implementation of this application provides a groove 50. The groove 50 is provided in the insulating layer 245 and located above an electrode 60. The groove 50 corresponds to the groove 2452 shown in FIG. 8*a* to FIG. 8*c*, and the electrode 60 corresponds to the first pixel electrode 2421 or the first common electrode 2431 shown in FIG. 8*a* to FIG. 8*c*.

The groove 50 includes a bottom 51 and a side wall 52 connected to the bottom 51. In the first implementation, the side wall 52 is perpendicular to the bottom 51. That is, an angle between the side wall 52 and the bottom 51 is a right angle. In this way, a width of an open end of the groove 50 is equal to that of the bottom of the groove 50.

Figure 12B:
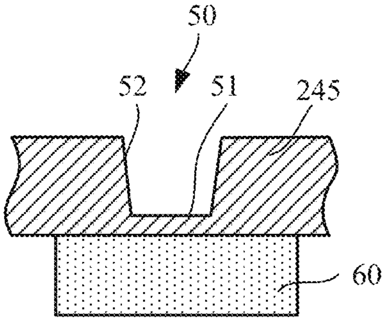
FIG. 12*b* is a structural sectional view of a groove according to the second implementation of this application.

Optionally, as shown in FIG. 12*b*, in the second implementation, the angle between the side wall 52 and the bottom 51 of the groove 50 is an obtuse angle. That is, the side wall 52 is an inclined surface. In this way, the width of the open end of the groove 50 is greater than that of the bottom of the groove 50, which can facilitate entry and exit of the electrophoretic particles from the groove 50.

Figure 12C:
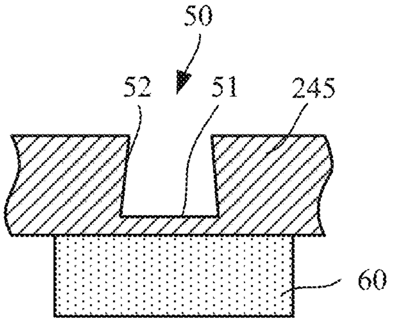
FIG. 12*c* is a structural sectional view of a groove according to the third implementation of this application.

Optionally, as shown in FIG. 12*c*, in the third implementation, the angle between the side wall 52 and the bottom 51 of the groove 50 is an acute angle. That is, the side wall 52 is an inclined surface. In this way, the width of the open end of the groove 50 is less than that of the bottom of the groove 50, so that the electrophoretic particles can be gathered into the groove 50 in the transmissive display mode.

Figure 12D:
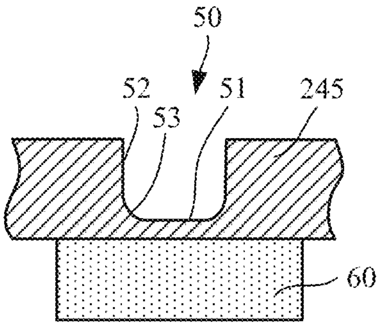
FIG. 12*d* is a structural sectional view of a groove according to a fourth implementation of this application.

Optionally, as shown in FIG. 12*d*, in a fourth implementation, the groove 50 may further include a first connecting portion 53 connected between the bottom 51 and the side wall 52. The first connecting portion 53 is arc-shaped, so that the side wall 52 smoothly transitions to the bottom 51.

Figure 12E:
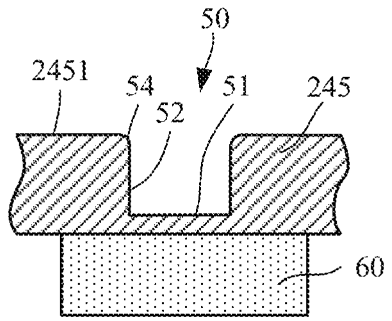
FIG. 12*e* is a structural sectional view of a groove according to a fifth implementation of this application.

Optionally, as shown in FIG. 12*e*, in a fifth implementation, the groove 50 may further include a second connecting portion 54 connected between the surface 2451 of the insulating layer 245 and the side wall 52. The second connecting portion 54 is arc-shaped, so that the side wall 52 smoothly transitions to the surface 2451 of the insulating layer 245.

It may be understood that the shapes of the groove 50 are not limited to those shown in FIG. 12*a* to FIG. 12*e*, and a person skilled in the art can make different deformation designs on the structure of the groove 50 according to actual design requirements. For example, the shapes shown in FIG. 12*a* to FIG. 12*e* are combined for deformation or deformed in another manner.

Further, a person skilled in the art can also make different deformations to the width and depth of the groove 50 on the basis of the groove 50 provided in this application. For example, a depth-to-width ratio of the groove is designed as 2:1, 3:1, or the like, which may be specifically adjusted according to an actual design requirement and is not specifically limited in this application.

In addition, it should be noted that the shapes of the groove 50 shown in FIG. 12*a* to FIG. 12*e* are shapes of sections of the groove 50 in a width direction thereof. A shape of the groove 50 in a length direction thereof is the same as a shape of the electrode (the first pixel electrode 2421, the second pixel electrode 2422, or the first common electrode 2431) corresponding to the groove 50. In this implementation of this application, each electrode is in a linear shape in a length direction thereof, and correspondingly, the groove 50 is also in a linear shape in the length direction thereof. In another implementation, each electrode may be in a wave shape, a zigzag shape, a square wave shape, or the like in the length direction thereof, and correspondingly, the groove 50 is also in a wave shape, a zigzag shape, a square wave shape, or the like in the length direction thereof. The shapes of the electrode and the groove 50 in the length directions thereof may be adjusted according to an actual design requirement, which is not specifically limited in this application.

Figure 13:
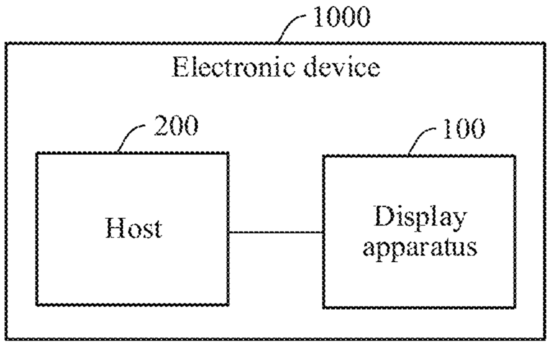
FIG. 13 is a schematic diagram of functional modules of an electronic device according to an implementation of this application.

As shown in FIG. 13, this application further provides an electronic device 1000. The electronic device 1000 includes a display apparatus 100 and a host 200. The display apparatus 100 corresponds to any one of the above display apparatuses 102*a* to 102*d* and 103*a* to 103*c*.

The host 200 may include components such as a processor (not shown), a memory (not shown), and a power module (not shown). The processor serves as a logic operation and control center of the electronic device 1000, and is mainly responsible for functions such as data processing, communication, and execution of drive output. The memory may be accessed by the processor or the like to store or invoke data. The power module is configured to supply power to other functional modules of the electronic device 1000, so that the other functional modules of the electronic device 1000 can operate normally.

The electronic device 1000 includes, but is not limited to, an e-book reader, a medical application (such as a glucometer or a sphygmomanometer), a wearable device (such as a watch or a bracelet), an indoor electronic display board, and the like.

Due to the application of the above display apparatuses 102*a* to 102*d* and 103*a* to 103*c* to the electronic device 1000 provided in this application, the display apparatus of the electronic device 1000 can have higher transmittance when the pixel unit is in the transmissive display mode, so as to achieve a good transparent display effect.

The above are only some implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An array substrate, applied to a display apparatus, the display apparatus further comprising a plurality of microcup units, each of the microcup units comprising at least one microcup, and electrophoretic particles being encapsulated in each of the at least one microcup; wherein the array substrate comprises a first base and a plurality of pixel units arranged in an array on the first base, the plurality of pixel units being in one-to-one correspondence to the plurality of microcup units; each of the pixel units comprising a first pixel electrode and a first common electrode that are disposed on the first base; and the array substrate further comprises an insulating layer covering the first pixel electrode and the first common electrode of each of the pixel units, a surface of the insulating layer facing away from the first base being provided with grooves/a groove corresponding to the first pixel electrode and/or the first common electrode of each of the pixel units, a width of the groove being less than that of the corresponding electrode, the groove being configured to gather the electrophoretic particles in the corresponding microcup, wherein when the pixel units are in a transmissive display mode, the electrophoretic particles are trapped in the groove for longitudinal arrangement, each of the pixel units further comprises a thin film transistor and at least one second pixel electrode, the second pixel electrode being electrically connected to a plurality of first pixel electrodes comprised in the corresponding pixel unit and a drain of the thin film transistor respectively, the second pixel electrode being configured to electrically connect the plurality of first pixel electrodes comprised in the corresponding pixel unit to the drain of the corresponding thin film transistor respectively.

2. The array substrate according to claim 1, wherein the surface of the insulating layer facing away from the first base is provided with the groove corresponding to the first pixel electrode, and the first pixel electrode is configured to attract the electrophoretic particles in the corresponding microcup when the corresponding pixel unit is in the transmissive display mode, so that the electrophoretic particles are gathered into the groove corresponding to the first pixel electrode; and/or the surface of the insulating layer facing away from the first base is provided with the groove corresponding to the first common electrode, and the first common electrode is configured to attract the electrophoretic particles in the corresponding microcup when the corresponding pixel unit is in the transmissive display mode, so that the electrophoretic particles are gathered into the groove corresponding to the first common electrode.

3. The array substrate according to claim 1, wherein the groove comprises a bottom and a side wall connected to the bottom;

the side wall being perpendicular to the bottom, or an angle between the side wall and the bottom being an acute angle, or the angle between the side wall and the bottom being an obtuse angle.

4. The array substrate according to claim 1, wherein each microcup comprises two types of electrophoretic particles with different colors and different electrical properties; and the surface of the insulating layer facing away from the first base is provided with the grooves respectively corresponding to the first pixel electrode and the first common electrode, and when the pixel unit is in the transmissive display mode, the first pixel electrode is configured to attract one type of the electrophoretic particles in the microcup into the groove corresponding to the first pixel electrode, and the first common electrode is configured to attract the other type of the electrophoretic particles in the microcup into the groove corresponding to the first common electrode; or the microcup comprises electrophoretic particles in one color; and the surface of the insulating layer facing away from the first base is provided with the groove corresponding to the first pixel electrode or the first common electrode, and when the pixel unit is in the transmissive display mode, the first pixel electrode or the first common electrode corresponding to the groove is configured to attract the electrophoretic particles in the microcup into the groove; or the microcup comprises electrophoretic particles in one color; and the surface of the insulating layer facing away from the first base is provided with grooves respectively corresponding to the first pixel electrode and the first common electrode, and when the pixel unit is in the transmissive display mode, the first pixel electrode is configured to attract the electrophoretic particles in the microcup into the groove corresponding to the first pixel electrode, or the first common electrode is configured to attract the electrophoretic particles in the microcup into the groove corresponding to the first common electrode.

5. The array substrate according to claim 1, wherein each of the pixel units comprises the plurality of first pixel electrodes and a plurality of first common electrodes, the plurality of first pixel electrodes extending along a first direction and being arranged apart along a second direction, and the plurality of first common electrodes extending along the first direction and being arranged apart along the second direction;

each of the first pixel electrodes being disposed between two adjacent first common electrodes, or each of the first common electrodes being disposed between two adjacent first pixel electrodes, wherein the first direction is perpendicular to the second direction.

6. The array substrate according to claim 1, wherein each of the microcup units comprises electrophoretic particles in one color, and each of the at least one microcup corresponds to at least one first pixel electrode and at least one first common electrode comprised in the corresponding pixel unit; and when the pixel unit is in a non-transmissive display mode, the first pixel electrode and the first common electrode are configured to generate a first driving electric field in the corresponding microcup to control the electrophoretic particles in the corresponding microcup to move along a direction parallel to the first base, so that the electrophoretic particles are evenly dispersed in an electrophoretic fluid; wherein an electric field direction of the first driving electric field is a direction parallel to the first base.

7. The array substrate according to claim 1, wherein the display apparatus further comprises a second base disposed opposite the array substrate and a second common electrode disposed on the second base, and the plurality of microcup units are disposed between the array substrate and the second common electrode;

each of the at least one microcup corresponds to the second common electrode and at least one first pixel electrode and at least one first common electrode comprised in the corresponding pixel unit;

when the pixel unit is in a non-transmissive display mode, the first pixel electrode and the first common electrode are configured to generate a first driving electric field in the corresponding microcup to control the electrophoretic particles in the corresponding microcup to move along a direction parallel to the first base, so that the electrophoretic particles are evenly dispersed in an electrophoretic fluid; and the first pixel electrode and the second common electrode are configured to generate a second driving electric field in the corresponding microcup to cause the electrophoretic particles in the corresponding microcup to move towards the first pixel electrode or the second common electrode according to electrical properties of the electrophoretic particles and an electric field direction of the second driving electric field; wherein an electric field direction of the first driving electric field is a direction parallel to the first base, and the electric field direction of the second driving electric field is a direction perpendicular to the first base.

8. The array substrate according to claim 5, wherein each of the pixel units further comprises a thin film transistor and at least one second pixel electrode, the second pixel electrode being electrically connected to the plurality of first pixel electrodes comprised in the corresponding pixel unit and a drain of the thin film transistor respectively, the second pixel electrode being configured to electrically connect the plurality of first pixel electrodes comprised in the corresponding pixel unit to the drain of the corresponding thin film transistor respectively.

9. The array substrate according to claim 8, wherein the insulating layer further covers the second pixel electrode, the surface of the insulating layer facing away from the first base is provided with the groove corresponding to the second pixel electrode, and the second pixel electrode is configured to attract the electrophoretic particles in the corresponding microcup when the corresponding pixel unit is in a transmissive display mode, so that the electrophoretic particles are gathered into the groove corresponding to the second pixel electrode.

10. A display apparatus, comprising:

a plurality of microcup units, each of the microcup units comprising at least one microcup, and electrophoretic particles being encapsulated in each of the at least one microcup;

an array substrate, comprising a first base and a plurality of pixel units arranged in an array on the first base, the plurality of pixel units being in one-to-one correspondence to the plurality of microcup units, each of the pixel units comprising a first pixel electrode and a first common electrode that are disposed on the first base, and an insulating layer covering the first pixel electrode and the first common electrode of each of the pixel units, a surface of the insulating layer facing away from the first base being provided with grooves/a groove corresponding to the first pixel electrode and/or the first common electrode of each of the pixel units, a width of the groove being less than that of the corresponding electrode, the groove being configured to gather the electrophoretic particles in the corresponding microcup, wherein when the pixel units are in a transmissive display mode, the electrophoretic particles are trapped in the groove for longitudinal arrangement, each of the pixel units further comprises a thin film transistor and at least one second pixel electrode, the second pixel electrode being electrically connected to a plurality of first pixel electrodes comprised in the corresponding pixel unit and a drain of the thin film transistor respectively, the second pixel electrode being configured to electrically connect the plurality of first pixel electrodes comprised in the corresponding pixel unit to the drain of the corresponding thin film transistor respectively;

a second base disposed opposite the array substrate; and a plurality of microcup units disposed between the array substrate and the second base, the plurality of microcup units being in one-to-one correspondence to the plurality of pixel units comprised in the array substrate.

11. An electronic device, comprising:

a host; and a display apparatus, wherein the display apparatus comprises:

a plurality of microcup units, each of the microcup units comprising at least one microcup, and electrophoretic particles being encapsulated in each of the at least one microcup;

an array substrate, comprising a first base and a plurality of pixel units arranged in an array on the first base, the plurality of pixel units being in one-to-one correspondence to the plurality of microcup units, each of the pixel units comprising a first pixel electrode and a first common electrode that are disposed on the first base, and an insulating layer covering the first pixel electrode and the first common electrode of each of the pixel units, a surface of the insulating layer facing away from the first base being provided with grooves/a groove corresponding to the first pixel electrode and/or the first common electrode of each of the pixel units, a width of the groove being less than that of the corresponding electrode, the groove being configured to gather the electrophoretic particles in the corresponding microcup, wherein when the pixel units are in a transmissive display mode, the electrophoretic particles are trapped in the groove for longitudinal arrangement, each of the pixel units further comprises a thin film transistor and at least one second pixel electrode, the second pixel electrode being electrically connected to a plurality of first pixel electrodes comprised in the corresponding pixel unit and a drain of the thin film transistor respectively, the second pixel electrode being configured to electrically connect the plurality of first pixel electrodes comprised in the corresponding pixel unit to the drain of the corresponding thin film transistor respectively;

a second base disposed opposite the array substrate; and a plurality of microcup units disposed between the array substrate and the second base, the plurality of microcup units being in one-to-one correspondence to the plurality of pixel units comprised in the array substrate.

12. The display apparatus according to claim 10, wherein the surface of the insulating layer facing away from the first base is provided with the groove corresponding to the first pixel electrode, and the first pixel electrode is configured to attract the electrophoretic particles in the corresponding microcup when the corresponding pixel unit is in the transmissive display mode, so that the electrophoretic particles are gathered into the groove corresponding to the first pixel electrode; and/or the surface of the insulating layer facing away from the first base is provided with the groove corresponding to the first common electrode, and the first common electrode is configured to attract the electrophoretic particles in the corresponding microcup when the corresponding pixel unit is in the transmissive display mode, so that the electrophoretic particles are gathered into the groove corresponding to the first common electrode.

13. The display apparatus according to claim 10, wherein the groove comprises a bottom and a side wall connected to the bottom;

the side wall being perpendicular to the bottom, or an angle between the side wall and the bottom being an acute angle, or the angle between the side wall and the bottom being an obtuse angle.

14. The display apparatus according to claim 10, wherein each microcup comprises two types of electrophoretic particles with different colors and different electrical properties; and the surface of the insulating layer facing away from the first base is provided with the grooves respectively corresponding to the first pixel electrode and the first common electrode, and when the pixel unit is in the transmissive display mode, the first pixel electrode is configured to attract one type of the electrophoretic particles in the microcup into the groove corresponding to the first pixel electrode, and the first common electrode is configured to attract the other type of the electrophoretic particles in the microcup into the groove corresponding to the first common electrode; or the microcup comprises electrophoretic particles in one color; and the surface of the insulating layer facing away from the first base is provided with the groove corresponding to the first pixel electrode or the first common electrode, and when the pixel unit is in the transmissive display mode, the first pixel electrode or the first common electrode corresponding to the groove is configured to attract the electrophoretic particles in the microcup into the groove; or the microcup comprises electrophoretic particles in one color; and the surface of the insulating layer facing away from the first base is provided with grooves respectively corresponding to the first pixel electrode and the first common electrode, and when the pixel unit is in the transmissive display mode, the first pixel electrode is configured to attract the electrophoretic particles in the microcup into the groove corresponding to the first pixel electrode, or the first common electrode is configured to attract the electrophoretic particles in the microcup into the groove corresponding to the first common electrode.

15. The display apparatus according to claim 10, wherein each of the pixel units comprises the plurality of first pixel electrodes and a plurality of first common electrodes, the plurality of first pixel electrodes extending along a first direction and being arranged apart along a second direction, and the plurality of first common electrodes extending along the first direction and being arranged apart along the second direction;

each of the first pixel electrodes being disposed between two adjacent first common electrodes, or each of the first common electrodes being disposed between two adjacent first pixel electrodes, wherein the first direction is perpendicular to the second direction.

16. The display apparatus according to claim 10, wherein each of the microcup units comprises electrophoretic particles in one color, and each of the at least one microcup corresponds to at least one first pixel electrode and at least one first common electrode comprised in the corresponding pixel unit; and when the pixel unit is in a non-transmissive display mode, the first pixel electrode and the first common electrode are configured to generate a first driving electric field in the corresponding microcup to control the electrophoretic particles in the corresponding microcup to move along a direction parallel to the first base, so that the electrophoretic particles are evenly dispersed in an electrophoretic fluid; wherein an electric field direction of the first driving electric field is a direction parallel to the first base.

* * * * *